United States Patent
Manroa et al.

(10) Patent No.: US 7,864,716 B1
(45) Date of Patent: Jan. 4, 2011

(54) TALK GROUP MANAGEMENT ARCHITECTURE

(75) Inventors: Arun Manroa, Herndon, VA (US); Ojas Choksi, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 794 days.

(21) Appl. No.: 11/706,224

(22) Filed: Feb. 15, 2007

(51) Int. Cl.
*H04L 12/16* (2006.01)

(52) U.S. Cl. .................. 370/260; 379/202.01; 455/519; 709/204

(58) Field of Classification Search .................. 370/260, 370/270, 390; 379/202.01–206.01; 709/204; 455/518, 519
See application file for complete search history.

(56) References Cited

U.S. PATENT DOCUMENTS

2006/0053208 A1* 3/2006 Laurila et al. ............... 709/206
2006/0058052 A1* 3/2006 Plestid et al. ............... 455/519
2007/0027975 A1* 2/2007 Tai et al. ..................... 709/223
2007/0220005 A1* 9/2007 Castro et al. .................. 707/9

* cited by examiner

*Primary Examiner*—Ricky Ngo
*Assistant Examiner*—Pao Sinkantarakorn

(57) ABSTRACT

Systems and methods for supporting group communications are provided. A group list management server (GLMS) stores communications group definitions in documents, such as extensible mark-up language (XML) documents. The communications group can include communication addresses for different types of communication applications, including electronic mail, voice telephone, data, instant messaging, voice dispatch, short messaging service (SMS), and multimedia service (MMS). Various methods for managing communications groups and features provided for communications groups are provided.

20 Claims, 19 Drawing Sheets

Common Specifications
*SyncML Representation
SyncML Server Alerted Notification
*MetaInformation
HTTP Binding
OBEX Binding
WSP Binding

Data Sync Specifications
SyncML Representation - DataSync Usage
DataSync Protocol
*Device Information
DataObjects-Email, File, Folder

Device Management Specifications
SyncML Representation - DM Usage
Device Management Protocol
Device Management Notification
DM Standardized Objects
Device Management Security
Device Management Tree

FIGURE 4

TALK GROUP MANAGEMENT ARCHITECTURE

CROSS-REFERENCE TO RELATED APPLICATIONS

The present application is related to U.S. patent application Ser. No. 11/706,219, entitled "Systems and Methods for Opt-In and Opt-Out Talk Group Management"; U.S. patent application Ser. No. 11/706,217, entitled "Systems and Methods for Talk Group Distribution"; and U.S. patent application Ser. No. 11/706,218, entitled "Systems and Methods of Group Distribution for Latency Sensitive Applications", all of which are filed on even date herewith and all of which are herein expressly incorporated by reference.

BACKGROUND OF THE INVENTION

Communication networks allow both one-to-one and group communications. Group communications can take a number of different forms, such as interconnect voice conference calls, and predefined dispatch group calls, e.g., those provided by the iDEN network owned and operated by Sprint Nextel Corporation. Typically group communications are performed and managed in a "siloed" manner such that individual applications manage their own group data and provide application/service-specific methods for group management. For example, a network operator may offer both dispatch group calls and groups for multi-media messaging (MMS). A group that is defined for a dispatch group call must be recreated for the MMS group because these group definitions are maintained in separate databases.

Recently the Open Mobile Alliance (OMA) published the "XML Document Management Requirements" Approved Version 1.0 paper (OMA-RD-XDM-V1_0-20060612-A), the entire disclosure of which is herein expressly incorporated by reference. This paper describes the use of XML documents for group management. However, this paper focuses on the use of groups for OMA Service Enablers in general such as Push-To-Talk over Cellular (PoC), Presence Services etc. The paper and the associated release documents do not address a number of issues such as charging, group distribution, policy and delegation rules, opting into (opt-in) and opting out (opt-out) of a group, multiple address and translation requirements and other membership rules.

SUMMARY OF THE INVENTION

As communication networks offer more communication services/applications to end-users the conventional siloed approach to communications becomes an obstacle to adoption of these additional communication services/applications. Specifically, each of these communication services are provided using different applications for implementing communications and/or managing the communications. Due to the separate design of each of these applications the end-user typically has to learn how to use each different application because each application may offer a different user-interface The present invention provides systems and methods for implementing and managing group communications, and features thereof. These systems, methods and features can support groups composed of end-users of a single communication application and/or different communication applications. For example, a group can include one member that has a dispatch communications application, one member with an instant messaging application and one member with both dispatch communication and instant messaging applications. The communications groups can include addresses for electronic mail, voice interconnect communications, instant messaging, voice dispatch communications, short messaging service (SMS), and multimedia service (MMS).

Other objects, advantages and novel features of the present invention will become apparent from the following detailed description of the invention when considered in conjunction with the accompanying drawings.

BRIEF DESCRIPTION OF THE DRAWING FIGURES

FIG. 4 illustrates the OMA specifications tree for the Sync ML protocol;

DETAILED DESCRIPTION OF THE PREFERRED EMBODIMENTS

In the following description the term group is intended be read expansively and not limited to particular types of groups. For example, the term group can include ad-hoc groups (i.e., groups that do not require a globally unique identifier and are generally managed in an end-user device), closed groups (i.e., groups that employ a globally unique identifier and that can be managed from a central location), corporate groups (i.e., a closed group that is created by an administrator/designated person for intra-corporate use), chatroom groups, personal groups (i.e., groups intended for personal use which can be ad-hoc or closed), private groups (i.e., groups that can only be used by members of the group), public groups (i.e., groups with a globally unique identifier that is available to both group members and non-members), and/or the like.

Groups by definition are a collection or an aggregation of similar objects or entities. In accordance with exemplary embodiments of the present invention, groups are a collection of individual's identities or other group identifiers. From a data representation perspective, groups can be represented as a tree structure. In this tree structure, the group identifier is the top element and the members of the group are child elements. This tree structure can be represented in a binary or text-based XML format. XML provides a text-based environment for describing and applying a tree-based structure to information. Accordingly, the present invention represents groups in XML documents that are structured to store group definitions and member identities.

These groups can include members with subscriptions to a variety of communication applications, including, but not limited to, electronic mail, voice interconnect, voice dispatch, instant messaging, short messaging service (SMS), multimedia service (MMS), and/or the like.

Exemplary embodiments of the present invention provide three different network architectures for implementing group communications and group management. These architectures can provide a number of features including a network address book service, a contact synchronization service, opt-in and opt-out service, group member suspension and resumption, group resolution, group management and group distribution service.

The first architecture is based on the XML document management server (XDMS) standard with, among other things, additional interfaces provided for web services. The second architecture is also based on the XDMS standard, but uses push notifications. The third architecture is based on the Open Mobile Alliance's (OMA) document management standards (DM), which is used for group list management and distribution.

Figure 1:
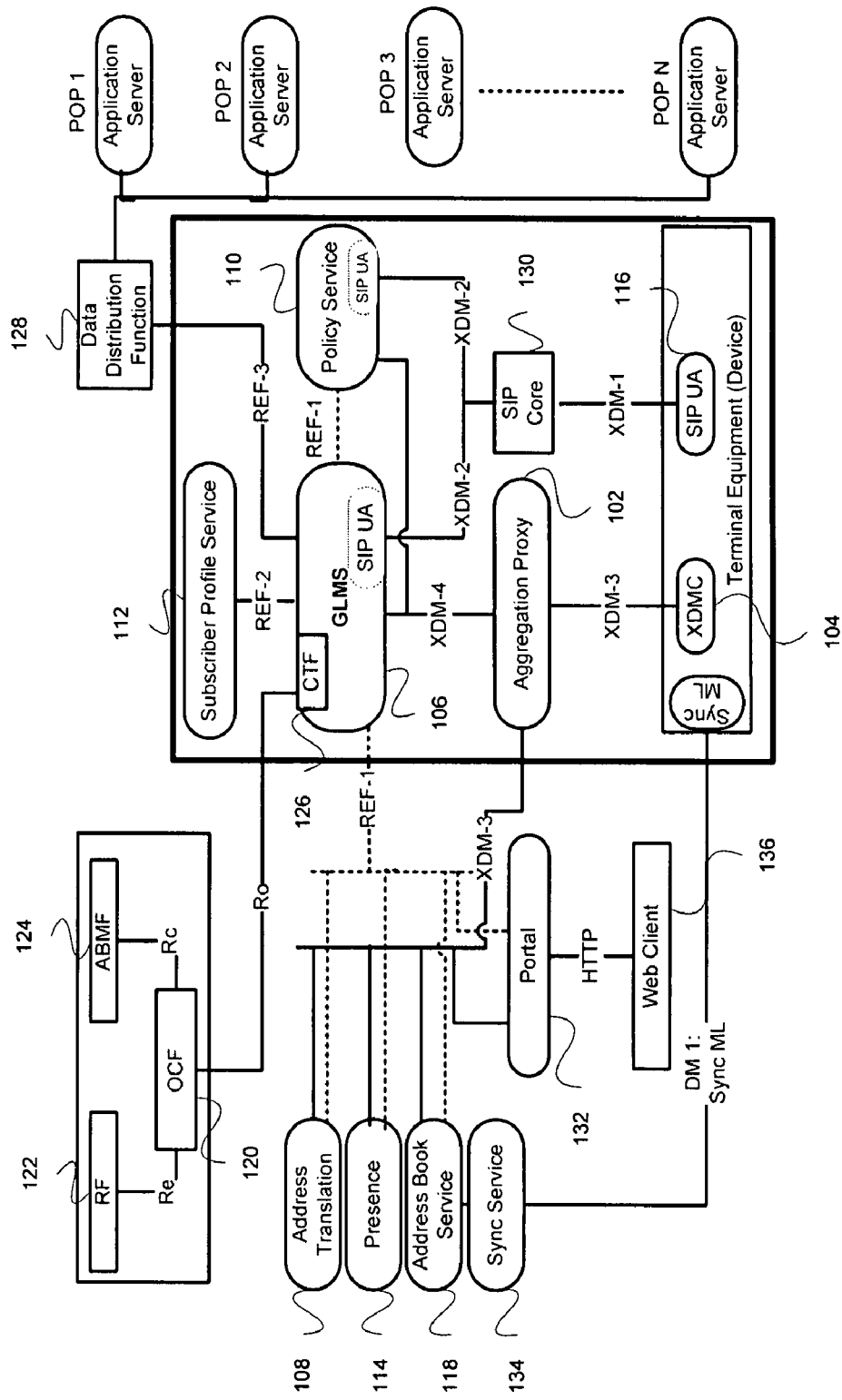
FIG. 1 illustrates a first exemplary group communications management architecture in accordance with the present invention.

FIG. 1 illustrates a first exemplary group communications management architecture in accordance with the present invention. This architecture supports opt-in/opt-out, address book synchronizations, policy management (with respect to groups; allowing users to set their authorization or preferences to participate in groups), group uniform resource identifier (URI) distributions, and subscriber profile and portal interactions. The architecture has the flexibility to manage groups via a web portal using HTTP, a mobile device using XML configuration access protocol (XCAP) as well as other application services using either a XCAP or a Web services application programming interface (API). The architecture illustrated in FIG. 1 is based on OMA XDM Standards with extensions for supporting server-to-server interaction of applications with XDMS, synchronizing the group definitions and the URI lists, implicit subscriptions for group notifications, a mechanism for the device client to learn of the URI List/XCAP URI list for the document owners, privacy of personal data, such as, principal identity according to privacy regulations, group distribution for latency sensitive applications, opting into and opting out of groups, and authorization process.

The functional entities have been divided into basic and optional entities, all of which can be implemented by one or more processors, such as microprocessors executing processor-readable code, application-specific integrated circuits (ASICs), field programmable gate arrays (FPGAs) and/or the like. The services and functions can be performed by one or more servers, and one or more of these services and functions can be combined on the same server, if desired. The basic functional entities should be implemented in order to achieve a minimal viable group management service. It should be recognized, however, that the present invention can be implemented with some of these functional entities combined into one system. Moreover, the present invention is delineated by the claims, and elements or features denoted as basic that are not recited in the claims should not be read into the claims. Additionally, elements and/or features described as basic but that are not recited in particular claims should not be considered unclaimed essential matter, as these claims may relate to portions and/or features of the system that are inventive and do not necessarily require other basic elements and/or features to operate and/or can operate with other elements and/or features. The optional entities, when implemented and integrated with the group architecture, provide additional features and enhance the end user experience.

Aggregation Proxy 102 is the front-end element for the XCAP requests, and depending on the request will proxy or fork it to specific destination XDM servers. The XCAP requests are encrypted from XDM Client/Agent (XDMC) 104 to aggregation proxy 102. XDM-3 interface provides encryption by optionally using HTTPS procedures. It also aggregates responses from other XDM servers and forwards the responses to XDM Client/Agent 104. Aggregation proxy 102 can perform content encoding, if desired.

Aggregation proxy 102 authenticates XDM Client/Agent 104 before it is allowed access to GLMS 106 or other XDM Servers (e.g., policy XDM servers within policy service 110). The authentication credentials can be stored as part of the device client configuration to allow for automated authentication process described in "XML Document Management (XDM) Specification", the entire contents of which is herein expressly incorporated by reference, or the device client identity could be asserted by lower layer data network access procedures. If a single sign-on service is available, it can be utilized to provide automated device client credentials that are appropriately tagged in the request. Authentication occurs on the XDM-3 interface using the standard HTTP digest mechanisms as specified in RFC 2616 "Hyper-text Transfer Protocol HTTP/1.1", the entire contents of which is herein expressly incorporated by reference. When web client 136 accesses GLMS 106 using HTTP protocol, authentication occurs at portal 132 and device client credentials are passed to aggregation proxy 102 over XDM-3. Aggregation proxy 102 need not re-authenticate the incoming messages, as the HTTP header indicates that the user has already been authenticated.

Group List Management Service (GLMS) 106 is the central core entity in the architecture. GLMS 106 is similar to a shared XDM server in the OMA document management architecture.

GLMS 106 processes CRUD (Create, Retrieve, Update and Delete) operations for groups that are requested from XDM Client/Agent 104 via the XCAP protocol or received through the simple object access protocol (SOAP) based web services interface or via published API's. One of the tasks of GLMS 106 is to ensure the global uniqueness of the group address/identifier. Unlike other list servers like buddy list classification and definition services whose scope is at the user level, the group identifier should be unique globally so that there is no conflict during group invocation and resolution. For example, two users could define a "buddy list" called "my_friends", however, they cannot have the same group identifier my_friends@networkoperator.com. When a request to create a group is received by GLMS 106, it ensures that the group identifier (not the display name) is globally unique. If the address is not globally unique GLMS 106, depending on configuration, could either automatically provide a unique address or reject the request with an appropriate error message. This function of GLMS 106 differentiates it from other XML document management servers like Black list/White list XDM Server, a "Resource List" XDM Server, etc., where the XML document's scope in these servers is local, limited to each individual user's span.

Another aspect of the global uniqueness of the identifiers is that, when possible, all applications for different communication services will address the group with that unique identification. However, some legacy applications cannot employ the globally unique identifier, and may require an application-specific group identifier. In this case GLMS 106 generates an application-specific group address to be used when the legacy application is invoked, in addition to generating a globally unique address for the group. For example Alice uses iDEN PTT, Group Text chat and an Email service, and Alice creates a group consisting of Ben, Carol and Dan. Since the iDEN PTT requires specific formats for communicating, GLMS 106 generates a globally unique identification for the group e.g. Alices_group@sprint.com and will also generate an iDEN PTT specific identifier e.g. 999*1*3456. The group identifier Alices_group@sprint.com is used for email and group text chat since both these services in this example can use the global identifier, however to invoke the iDEN group Alice has to use the 999*1*3456 address. Thus, it becomes the function of the GLMS to create a globally unique address of the group for majority of the applications, and for applications that cannot use that format the GLMS will create application-specific address, which are unique in the application domain but may or may not be globally unique. Address translation service 108 can store the application-specific address for each member of the group to ensure the application-specific group is resolved in addressing formats in compliance to the application.

In current communication networks different applications use different addressing formats e.g., picture mail, push-to-talk, email, voice, etc. In order to reap the benefits of a globally unique group definition that can be used across different applications GLMS 106 provides multiple unique addressing formats for the same group collection, such that the multiple unique address are alias of the same group definition. This functionality is achieved by GLMS 106 interacting with address translation service 108.

GLMS 106 also provides two types of notifications, one for group changes (the "auth" event) and the second one for group events (the "group" event). Both notifications are implemented using appropriate subscriptions and permissions that are established before the event occurs. Details on the use of these subscriptions and notifications are described below.

GLMS 106 verifies authentication credentials of requests from aggregation proxy 102. Although GLMS 106 is not responsible for authenticating the device client, it still has to ensure that aggregation proxy 102 has inserted an appropriate authentication header in the request. GLMS 106 performs authorizations by collaborating with policy service 110.

Policy service 110 is a framework in which the rules, permissions conditions and actions are defined. Depending on the maturity of the service and system design, three sets of implementations can be achieved for policy service 110. In a first implementation policy service 110 can be an intrinsic service (i.e., policy management and enforcement done by the policy service). In a second implementation, policy management and enforcement are segregated (policy service manages the policy documents and the GLMS is responsible for the enforcement). In the third implementation, GLMS 106 manages the policy documents with respect to groups and is also responsible for the enforcement of such policies.

In this architecture it is assumed that policy service 110 is an intrinsic service and GLMS 106 interacts with policy service 110 to get appropriate authorizations. It should be noted that even though the policy service provides authorizations, the authorization attributes are distributed to other services as well. GLMS 106 interacts with subscriber profile service 112 as the first step to determine user's subscription to the GLMS service. GLMS 106 then applies the global policy rules depending on the group context and definitions of member attributes, and finally it may interact with the policy service for opt-in authorizations. For example, subscriber profile service 112 defines if the subscriber is allowed to use the group management services. Moreover, for other authorizations GLMS 106 has authority and need not request policy service 110 to provide authorizations, e.g., by default GLMS 106 allows the group owner to modify the group without invoking policy service 110.

GLMS 106 also interacts with the subscriber profile service 112 to retrieve subscribers' provisioned parameters. A profile informs GLMS 106 whether the subscriber is allowed to make any group management operations. If the profile is in a home subscription server (HSS), access to the subscriber profile service could be through the Sh interface. Alternatively, access can be through another interface that the subscriber profile service exposes.

GLMS 106 provides notifications to group changes in documents and other group events. GLMS 106 maintains awareness of the subscribers' registration state for efficient notifications. A subscriber's registration state can be provided by subscriber profile service 112 or by presence service 114 (if available). When the notification event is triggered, GLMS 106 uses these services to ensure that the subscriber is available before attempting to deliver the notification. If the subscriber is not available, then the notification can be deferred and will be delivered when it is determined that the subscriber is available. However, this optimization is optional because the SIP Notify protocol ensures reliable delivery of the notify message.

Policy Service 110 authorizes requests and applies any privacy rules to the response. This service provides a common store for user preferences and manages policy documents. If there are global policies that are provided by the service operator, they may take precedence over individual policies. The user uploads the policies via the XDM-3/XDM-4 interface. GLMS 106 collaborates with policy service 110 to ensure proper authorization of the requests. The level of collaboration depends on how policy service 110 is implemented in the network. One exemplary user preference is whether the user desires receipt of notifications for group and/or auth events.

In accordance with one exemplary embodiment of the present invention, portal/provisioning system 132 can interact with policy service 110 directly and authorize the group operation request before sending it to the GLMS 106. In this embodiment the role of GLMS 106 is limited to ensuring global uniqueness of the group identifier, storing the group definitions, interacting with address translation service 108 (if required) and interacting with the document management/device synchronization (DM/DS) services to distribute the group definitions. If the portal/provisioning systems have already authorized the request, then it must properly tag the request in the API call to GLMS 106 to inform GLMS 106 that the authorization has already taken place.

SIP user agent is a logical entity that acts both as a user agent client and a user agent server. The user agent client creates a transaction by initiating a SIP Request and the client maintains a state for the duration of the transaction. The user agent server generates a response to the SIP Request, and the response accepts, rejects, or redirects the request. This role lasts only for the duration of that transaction. From the group management perspective SIP user agent resides in the users' equipment terminal, GLMS 106 and policy service 110. The SIP user agent provides SIP Subscriptions and SIP Notifications as specified in the Internet Engineering Task Force (IETF) Request for Comments (RFC) 3261 and RFC 3265 and is extended in the present invention for event packages "auth" and "group" as elaborated below.

REF-2 is an interface between GLMS 106 and the subscriber profile service 112, and is used by GLMS 106 to retrieve subscriber profiles and device capabilities. When GLMS 106 receives a group management request from a user, GLMS 106 interacts with the subscriber profile service 112 to retrieve the profile. Subscriber profile service 112 may publish a Web services SOAP-type interface for the GLMS interactions. The subscriber's profile has a number of attributes that GLMS 106 uses as a first authorization step in processing the request. The profile contains information about the subscription to GLMS 106 and other services that GLMS 106 uses to determine the scope of the group creation (e.g., should the group span push-to-talk only or electronic mail, voice, etc.). The profile also contains information about the users "synchronization" service subscription that GLMS 106 uses to determine the group definition synchronization process.

The physical implementation of the REF-2 interface could be a DIAMETER (Sh or COPS) based protocol, open database connectivity protocol (ODBC) or a Web (SOAP) services interface. Further, the physical mapping of the subscriber profile could involve multiple physical databases, like HSS (Home Subscriber Server), CDM (Customer Data Mart) or a virtual layer that provides this information from various underlying elements. Finally, the subscriber profile service attributes are controlled by the service provider, and the end-user (subscriber) cannot change those attributes, although policy service 110 allows the subscriber to manage individual preferences. Upon retrieval of a subscriber profile, GLMS 106 ensures that the user has subscribed to the GLMS services (the granularity of the profile could indicate the type of groups the user can create, e.g., closed groups, chat-rooms, etc).

XDM Client/Agent 104 interacts with the XDM servers via the aggregation proxy 102. XDM Client/Agent 104 and aggregation proxy 102 communicate using the XDM-3 interface, which is a connection-oriented interface that uses TCP/HTTP as a transport. The group management and policy management functions like creating, retrieving, updating and deleting group and policy documents are done via this interface. This interface also protects GLMS 106 and policy service 110 by providing device client authentications. For over-the-air optimization this interface supports compression, if desired. This interface complies with the OMA XDM-3 reference point described in "XML Document Management Architecture", the entire disclosure of which is herein expressly incorporated by reference.

The XDM-4 interface is an XCAP interface that forwards the authenticated device client request from aggregation proxy 102 to the various XCAP servers (e.g., GLMS 106, policy service 110, etc.). This interface complies with the OMA XDM-4 reference point described in "XML Document Management Architecture". The XDM-4 interface is used by GLMS 106 to access policy service 110, which stores global policy documents specific to the GLMS, e.g., global rules for a group owner, rules for a delegate and group number. GLMS 106 interacts with the policy service to fulfill the opt-in process. The XDM-4 interface is used to get the standard and global policy rules that GLMS 106 uploads during startup. The XDM servers are GLMS and XML document servers contained in policy service 110.

XDM Client/Agent 104 is implemented in the subscriber's equipment terminal that is used to access the network. This terminal can be, for example, a wireless mobile station that operates on macro wireless networks, a WiFi or WiMAX mobile station, a wireless personal digital assistant (PDA), fixed-line device and/or the like. XDM Client/Agent 104 implements the XCAP protocol as per the "Extensible Markup Language (XML) Configuration Access Protocol" document and supports resource lists and differential lists as specified in an "Extensible Markup Language (XML) Formats for Representing Resource Lists and an Extensible Markup Language (XML) Document Format for Indicating Changes in XML Configuration Access Protocol (XCAP) Resources", the entire disclosure of which are herein expressly incorporated by reference. XDM Client/Agent 104 can also be implemented in a network-based application server where the application server assumes the role of the XDM Client/Agent and uses the XCAP protocol with other XDM servers.

Now that the basic entities have been described, the optional entities will be presented. These entities have been classified as optional from a perspective that they add value by managing groups beyond the device/terminal and enabling interactions beyond the basic ones (e.g., CRUD).

Address book service 118 provides a network-based storage for personal contact data. A group entry in a user's address book will be perceived, by the user, in a similar way to a contact or individual entity. Hence, even though at the network layer these are managed by distinct services, the end-user should be provided with a unified view of his/her "contacts". Thus, GLMS 106 and address book services 118 interact in order to provide that unified view to the user. Further, since user subscription to a network-based address book is optional (i.e., it may not be bundled as part of the basic package), group management service is not dependent on the address book service 118 for delivering end-to-end group functionality.

Address translation service 108 provides a mapping between various user identities. If a group spans multiple services, and if those services are addressed using different addressing formats, then GLMS 106 interacts with the address translation service 108 to construct multiple group identities specific to each service. Address translation service 108 may not be needed when individual addresses for various applications are included in the request to create group.

Online charging function (OCF) 120 performs event-based charging in conjunction with charging trigger function (CTF) 126 in GLMS 106, which generates the events for the charging trigger. Online charging function 120 internally interacts with rating function (RF) 122 and the account balance management function (ABMF) 124. Rating function 122 determines the necessary monetary charge which it then updates in the account management balance function (ABMF) 124. For more details the interested reader can refer to 3GPP "Charging Management Technology Specification" Technical Specification 32.240, the entire disclosure of which is expressly incorporated by reference. If prepaid subscribers or third party applications are charged in real-time for performing group management functions, then GLMS 106 implements the charging trigger function 126 that interfaces with online charging function 120 to authorize the group operations. Aggregation proxy 102 and GLMS 106 provide charging events and logging that is used for post-billing. For event-based charging of CRUD operations, GLMS 106 interacts with the online charging function 120 via CTF 126 that is compliant with the aforementioned 3GPP Technical Specification. Although charging may not be implemented for the network operator's subscribers, it may be required for external entities (e.g. developers, MVNOs, advertisers, external subscribers etc.).

Data distribution function 128 distributes group data and other related information to latency sensitive applications servers, e.g., push-to-talk application servers. Having a local copy of the group definitions saves processing and roundtrip delays to GLMS 106, and allows applications to rapidly process the incoming setup request by not having to access GLMS 106 for the group membership. When a group is defined for latency sensitive applications, GLMS 106 recognizes this by using a combination of the group request (that contains the service identification) and locally configured parameters, and then forwards the group information including the service identifier to data distribution function 128, which then retrieves the list of application servers that need the data and reliably pushes this to each application servers.

The REF-3 interface is used for latency sensitive applications. GLMS 106 uses this interface to push group definitions to data distribution function 128. It becomes the responsibility of data distribution function 128 and the distribution network to ensure a reliable distribution of the group data to the application servers. The protocol for this reference point is dependent on the implementation of the data distribution service and can be ODBC a Web services/SOAP type interface, etc., for the GLMS interactions.

Network-based presence service 114 provides presence data to watchers. Presence service enhances group usability by providing presence information for group members. Presence service 114 is not required for providing basic group management service, but is required if a user were to request presence subscription for groups, in addition to that of individuals in his/her buddy list.

Portal 132 provides a variety of web-based services, e.g., managing/viewing customers' bills, managing address books, presenting marketing offers, customer support, device management etc. Portal 132 provides both public content that can be viewed by anyone and secure content that is available only after appropriate user authentication and authorization. Portal 132 aggregates content from several backend services and presents it to the user's web client to be rendered in a graphically rich format. Communications between portal 132 and web client 136 are encrypted. The portal allows users to create, view and manage groups. Web client 136 is a HTTP-enabled client that interacts with portal 132. Web client 136 processes user inputs, facilitates user interactions for group data management, and renders portal responses to the user in an appropriate format. Web client 136 can be implemented on a separate device or can be a component of the terminal equipment.

SIP core 130 is a collection of SIP enabled servers that include SIP user agent servers, SIP Proxies and SIP Registrars. These elements play a role in routing the SIP messages based on the Request URI. SIP core 130 routes the SIP Subscribe Notify messages between SIP user agent 116 and GLMS 106. In the OMA/3GPP specifications the SIP core 130 is synonymous with an IMS core. The XDM-2 interface forwards the SIP message to the GLMS 106, and when the SIP/IP Core network 130 corresponds to 3GPP IMS or 3GPP2 MMD, the subscriber's preferred public SIP URI is inserted in P-Asserted-Identity header. On the return path the XDM-2 interface transports the SIP Notify message to the device client. This interface complies with the OMA XDM-2 reference point described in "XML Document Management Architecture", with the addition of the "group" and "auth" event packages described below. The XDM-1 interface is used by SIP user agent 116 to send and receive SIP Subscribe and Notify messages to SIP core 130. This interface complies with the OMA XDM-1 Reference Point described in "XML Document Management Architecture", with the addition of the "group" and "auth" event packages.

Synchronization service 134 synchronizes end-user's personal information like address book data, etc., across multiple devices owned by the user. The synchronization service facilitates distribution of group data to various devices owned and registered within a user's account. However, since subscription to synchronization service may be implemented as an optional service, group management service is not dependent on synchronization and/or address book service 118 for implicitly notifying and distributing the group data to the users' identified as group members. To a subscriber the group identifier is just another contact in the address book and much like individual contacts expects them to be backed up and synchronized across various devices owned by him/her.

The DM-1 interface, between the user terminal and synchronization service 134, is the SyncML interface that allows the network to manage devices and synchronize address books and other data. This interface is compliant with the OMA DM specifications, and is optional for the group management architecture. Once the group is created, GLMS 106 forwards the group address (URI) and other data, such as the group definitions, (entire member list need not be sent) to address book 118 and synchronization service 134, which then synchronize the group address using the SyncML protocol to the members of the group. If synchronization is a paid service, the distribution can be performed using the SIP Subscribe Notify interface. Similar to "auth" event package for authorization, the present invention defines a "group" event package, to which users subscribe to group URIs, the subscription allows distribution of group information via notifications.

The REF-1 interface is used for authorization services and provides the capability for GLMS 106 to integrate into the Web Services and SOAP Architecture. It allows access to GLMS 106 by other intrinsic services and third party application developers so that they can embed group functionality into their applications. It also allows GLMS 106 to interact with other services like address translation services, policy services etc. This interface is used by GLMS 106 to access policy service 110, which stores global policy documents specific to GLMS 106, e.g., global rules for a group owner, rules for a delegate and group member. The standards-based reference architecture for GLMS 106 is extended to support group management via a web services interface/SOAP API's. The REF-1 interface provides an opportunity for other application servers to interact with GLMS 106 without having to implement a XDMC client. It also provides GLMS 106 with the ability to interact with other service enablers like address translation service, policy service, etc.

Now that the first exemplary architecture has been described, various features using this architecture are described below. Exemplary embodiments of the present invention provide mechanisms for discovery of the GLMS and policy service. The XDM Client/Agent 104 is configured with the fully qualified domain name (FQDN) of the XCAP root and the audit ID (AUID) of GLMS 106 and policy service 110. These FQDNs generally resolve to the XDM aggregation proxy which can be factory parameter or could be configured using over-the-air protocols like OMA DM. When a user or an application server acting as an XDMC needs to perform group management operations, the network DNS (Domain Name Server) is used to resolve the configured address, and aggregation proxy 102 uses the GLMS AUID in the XCAP URI to route the request. Similarly, when a user or an application server acting as an XDMC needs to perform policy management operations, the network DNS is used to resolve the configured address, and the aggregation proxy uses the Policy AUID in the XCAP URI to route the request. The SIP user agent uses the procedures defined in IETF RFC 3263 to discover the SIP interface (IP, Port and Transport UDP/TCP) of GLMS 106 and policy service 110. The GLMS and policy service discovery reference points are not shown in FIG. 1.

The present invention allows for over-the-air optimizations. The over-the-air bandwidth optimization can be accomplished either via regular HTTP compression or through WB XML (binary XML) protocols on XDM-3 interface. WB XML can be employed when there are a large number of transactions per subscriber per busy hour.

Exemplary embodiments of the present invention provide group subscriptions and notifications, which are features that allow users to subscribe to and get notified of changes to group data and inclusion of the user into as a member of a group. The interface XDM-1/XDM-2 provides the flexibility for subscription to standard event packages as well as network operator defined event packages. One particular extension is the "implicit subscription" to groups that have not yet been created, so that when a group is created or new members added, new members of the group can get an explicit notification of their inclusion in the group.

Policy service 110 also provides a subscription and notification feature that allows users to subscribe to and get notified of "authorization" events, which is an event package that supports opt-in (described below). A subscriber has to subscribe to the "auth" event package with policy service 110 using the XDM-1/XDM-2 interfaces.

GLMS 106 also provides a subscription and notification feature that allows users to subscribe to and get notified of "group" events. This is an event package that supports group distributions if the device client does not support synchronization service 134. A subscriber has to subscribe to the "group" event package with GLMS 106 using the XDM-1/XDM-2 interfaces. The group event provides notifications when the group is created and also when the group definition is deleted. It should be noted that this is different from the standard XCAP "diff" event package that provides notification for changes to the document.

Another feature of the present invention is the ability to opt-in to a group, which can be supported via implicit subscription to the "auth" event with policy service 110. Notifications for opt-in events are sent over the XDM-1/XDM-2 interfaces.

It is should be recognized that currently OMA XDM only specifies subscriptions using the SIP user agent profile for document changes. More specifically, the AUID to be watched has to be placed in the "auid" event header parameter, and the Group URL in "document" event header parameter as specified in the IETF document "A Framework for Session Initiation Protocol User Agent Profile Delivery," the entire disclosure of which is herein expressly incorporated by reference. In cases where the "document" header is not being used, it specifies that a subscription be placed to all the documents under the AUID owned by the user identified in the Request-URI. See, for example, "XML Document Management (XDM) Specification". Accordingly, the user either "subscribes" to changes to a specific document change or all document changes. A mechanism to subscribe to future documents in which the "elements" match specific strings has not been specified in the standards. Further, the mechanism to get an explicit authorization from the user before being added to group is not defined in the standards.

Below is an example of an event header where the subscriber wants to be notified of changes for the "joebloggs-_friends" document. See "XML Document Management (XDM) Specification".

Event: ua-profile;profile-type = "application";
auid = "org.openmobilealliance.pocgroups";
Vendor = "vendor 1";
Model = "1";Version = "1.0";document = "org.openmobilealliance.poc groups/
users/sip:joe.bloggs@example.com/joebloggs_friends/"

As described above, the present invention includes an "auth" event package that is an extension to existing standards. The "auth" event package facilitates user receipt of notifications from policy service 110 when explicit authorization from the user is required. Depending on the user policy, explicit authorization may be required for addition to a group and/or changes to a group and deletion from a group. In accordance with exemplary embodiments of the present invention, an event package in the subscription body in combination with policy rules that the user has uploaded indicate the specific events for which notification is required. The notification would, at a minimum, indicate the group owner, the group URL and the specific action being taken. The notification is delivered to the device client over the XDM-1/XDM-2 interface. Depending on the user interface design in the terminal, the notification can be announced to the user with an audio-visual alert. The notification can also be placed in a message queue for user action.

Policy service 110 embeds context specific feedback commands in the notification body, that could be presented via the user interface for feedback. For example, context specific commands may include "accept", "reject", "always accept from <group owner>", "always reject from <group owner>" etc. Adding context specific commands by policy service 110 simplifies user interface design in the terminal. When the user provides feedback to the notification, the response is formatted as an XML document. The XDM Client/Agent 104, via the XDM-3/XDM-4 reference points, then uploads the document to policy service 110. Policy service 110 acts on the uploaded document and provides feedback to the requesting service (e.g., GLMS 106). In some cases the "context specific" commands may not be present in the notifications to the device clients, these notifications are called informational notifications and the system is not expecting and/or does not require any feedback from the user/device client. Informational notifications, as the name suggests, are used as unidirectional notifications to the user, due to some external event or user configured criteria.

Regarding group distribution, the conventional OMA XDMS architecture does not allow a user to distribute an XML document via the XDMS server to other users. However, it does allow users to fetch the document using an XCAP GET method if the document URL is known. OMA XDMS also does not specify the mechanisms for the user to learn of the document URL. Other areas of OMA, for example the OMA PoC, specify a group advertisement process by using the SIP MESSAGE method. One problem of the message method is that it can be used for spamming and denial of service attacks by opening the door for unsolicited messages to the terminal. This can be controlled by making it incumbent on the device client to indicate its preference of receiving new group definitions via an explicit SIP SUBSCRIBE message.

To overcome constraints of conventional OMA/XDMS architecture described above, another extension to the standards provided by the present invention is the "group" event package. In order to support subscription to future group definitions (groups that have not been defined yet), an event package called "group" event is employed that can be inserted in the SUBSCRIBE message, which is then sent to GLMS 106. GLMS 106 sends the Notify to the "group" event that includes an XML body (e.g., resource-list+xml) informing the user when new groups are created or deleted. The device's user interface may present the notification via the appropriate audio-visual indications and place the notifications in a queue for user action. The user action can be to add or remove the group definition to or from the personal address book. This distribution occurs at the time of group creation or deletion. In some implementations the group owner can request the redistribution of the group with the group members after the group has been created.

This subscription to the "group" event is used when the device client has not subscribed to address book 118 and synchronization 134 service. If the user has subscribed to address book 118 and synchronization 134 service then GLMS 106 interacts with these services in the network layer. Address book 118 and synchronization service 134 then use the SyncML protocol to distribute the group definition to the user. For each user in the group, GLMS 106 interacts with subscriber profile service 112 to determine the method of group distribution i.e., using "group" event subscription or via address book service 118 and synchronization service 134.

Authorizations in GLMS 106 are required for creating groups, for adding user to a group, deleting users, and deleting groups, and group distribution and event subscription (group events and group changes subscriptions). For policy service 110, authorizations are required for managing the policy documents and "auth" event subscriptions. GLMS 106 interacts with policy service 110 and subscriber profile service 112 to obtain proper authorizations for performing group management.

For creating groups, GLMS 106 obtains the subscriber data from subscriber profile service 112, which has the data attribute that indicates if the subscriber is allowed to use the GLMS service. This attribute is added as part of the provisioning process of the subscriber.

GLMS 106, by default, allows the group owner to add or delete members to the group. In order for other group members or designated delegates to modify the group, GLMS 106 interacts with policy service 110 to determine if the appropriate operation is allowed. GLMS 106 also uploads and stores pre-defined rules from policy service 110 for role-based authorizations such as administrator, delegate, chairperson, preferred user, default user etc. If the group owner identifies each member of the group with a specific role as part of the group definition, then GLMS 106 independently processes the group modification request provided the requesting users still have a valid subscription to GLMS service as part of the user profile. The role-based policy documents are part of policy service 110 and GLMS 106 uploads them during startup via the XDM-4 interface and subscribes to changes to these global policy documents via the XDM-2 interface.

If the XCAP PUT URI has a user identifier that does not match the user performing the action (request), then GLMS 106 verifies if the request is a "delegate" action (i.e. a delegate creating or updating a group) or a member changing his/her attributes to "suspend" or other attributes as defined by the policy rules.

For opt-in, GLMS 106 interacts with policy service 110 by sending the group definition to policy service 110 and waiting for explicit authorization before adding the user to the group. If a subscriber needs to update the policy with regard to the opt-in process, the user interacts with policy service 110 to update group related policies, such interaction being a one time authorization/rejection or a permanent rejection/acceptance for Black/White lists that the policy service maintains. For example, Alice creates a group that includes Bob, and Bob's policy rules indicate that he must be notified for all group inclusions. Bob may give permission for his inclusion into the group. In addition, if Bob wants to automatically authorize his inclusion in groups that Alice creates in the future, he can upload a policy document (e.g., an XML document) to policy service 110 indicating that by default, Bob should be included in all groups created by Alice without explicit authorization from the him.

GLMS 106 also brokers between user, account and carrier policies in a consistent manner to ensure appropriate user experience of group management service.

Opting-out of the group is supported via the XCAP interface. The user may get notified when the group is created via a SIP Notify, the user may see the group as part of the synchronization process, or the user may be pulled into a group call and may choose to opt-out permanently or suspend membership for a period of time. If a user does not wish to participate in the group permanently the user can use the XCAP DELETE method, and if the user does not wish to participate in the group for a specific time (suspend) the user can use the XCAP PUT to change the attributes to indicate a suspension. Upon user input, the XCAP client uploads an XML document to GLMS 106 via the XDM-3/XDM-4 interface indicating either a suspension or deletion. GLMS 106 acts according to the instructions received in the XML document from the client and any policies surrounding the opting-out, i.e., opting-out of a group may/may not be allowed depending on the group type and other settings of the group. Specifically, groups can be created where membership is mandatory and group members are not provided with an option of accepting membership. For example, a CEO can create a group with mandatory membership and all group members automatically become members of the group.

Depending upon implementation, either the XCAP Delete or the XCAP PUT method can be employed.

For delete operations, GLMS 106 ensures that the device client's asserted identity matches the members' list entry the user is trying to delete to ensure that a member of a group can delete only their entry from the group membership. A "delegate" has the capability to perform all operations on the group by definition (or as defined by the policy service), but a member may only have the authorizations to delete themselves from the group. Thus, upon receipt of the XCAP DELETE operations, GLMS 106 uses the device client's "Asserted Identity" and compares that with the XUI (XCAP URI) path that has the group owner. The comparison of the two identities determines if the request is from the group owner, group delegate or any member of the group. Because the opt-out is for group members to either "reject" or "suspend" their membership from the group, GLMS 106 ensures that members can change their attribute.

In accordance with one implementation the XCAP PUT method can be employed for both the "reject group membership" and "suspending group membership". Accordingly, the user changes the corresponding attribute in the XML document by using the XCAP PUT method, which allows GLMS 106 to keep transient state of the members' request to opt-out. The transient state of the member attributes (e.g., a member changed his/her group membership attribute from "active" to "reject") is useful when the group owner has subscribed to "notification" for group changes. If the group owner is currently unavailable to receive the notifications (e.g. due to power off or out of coverage), GLMS monitors the transient state (e.g., active to reject) since GLMS 106 also needs to notify the group creator of the progress of the group formation. Further, the watchers of the group are notified of the change.

The "auth" event and the "group" event packages appear similar but they serve different functions. The "auth" event receives notifications when authorization is required and the "group" event receives notifications of the group identifier, display name, parameters, etc. It is possible that a subscriber can receive two notifications, one due to an "auth" event and the other due to a "group" event. For example, Bob has not subscribed to the synchronization service, so Bob subscribes to "group" events with the GLMS. Bob also has a default policy in the policy service that indicates that he must be notified to get an explicit authorization before being added to a group. Now Alice creates a group that has Bob as a member. Policy service 110 notifies Bob of the request. Once Bob accepts the membership, the group is created, and as soon as the group is created Bob is notified by GLMS 106 of the new group. Accordingly, for the same group Bob received two notifications but for different reasons.

Assume now that Bob defines a policy rule (formatted as an XML policy document) that provides automatic acceptance for groups that Alice creates and includes him as a member. The policy document is uploaded over the XDM-3/XDM-4 interface. When Alice later creates a new group that includes Bob, he receives only one notification from GLMS 106 due to the "group" event subscriptions.

Application-specific GLMS functions can be provided as a software extension (plug-in) to GLMS 106 or could be implemented as a separate entity. If it is implemented as a separate entity then GLMS 106 can use the XDM-4 XCAP or the REF-1 interface for collaborating with the application-specific GLMS. Distributing groups to latency sensitive applications, specific address translation functions for applications are examples of application-specific functions. The application-specific functions are not illustrated as a separate entity in FIG. 1.

The OMA XDM specification does not specify procedures for a XDM client/agent to learn the XCAP URI's of other user's document and without knowing the globally unique group identifier the group cannot be invoked, joined, etc. Using the implicit subscriptions for group "event" package, the present invention allows members of the group learn of the group URI by the notifications from GLMS 106. Further, the architecture is flexible to support HTTP-based mechanism to perform search operations via the portal or other search methods like voice enablement. These interfaces are not illustrated in FIG. 1.

In order to support privacy, the architecture of FIG. 1 employs the IETF's Common Policy specification (Document Format for Expressing Privacy Preferences) and the common policy extensions defined in OMA PoC and Presence XDM specifications. Users can use the XDM-3/XDM-4 to upload their privacy preferences to policy service 110. Other applications of privacy are anonymity as part of the group definitions, e.g., users could choose to be anonymous as part of the group definitions so that when other members retrieve the group definitions their name/address is withheld by GLMS 106.

The architecture described above is standards-based and uses open protocols like XCAP, SIP and DIAMETER protocols and web services concepts like Parlay X and SOA. The architecture is extensible for future applications requiring service composition and shared resource management, i.e., presence, instant messaging, etc. It allows multiple applications to use group definitions. The architecture provides freedom to perform custom operations e.g., group distribution for latency sensitive applications such as push-to-talk. Implementing a standards-based client (XDMC) on the device provides for multiple OEM vendors to offer the group management as a native support in the device for XCAP protocols.

Figure 2:
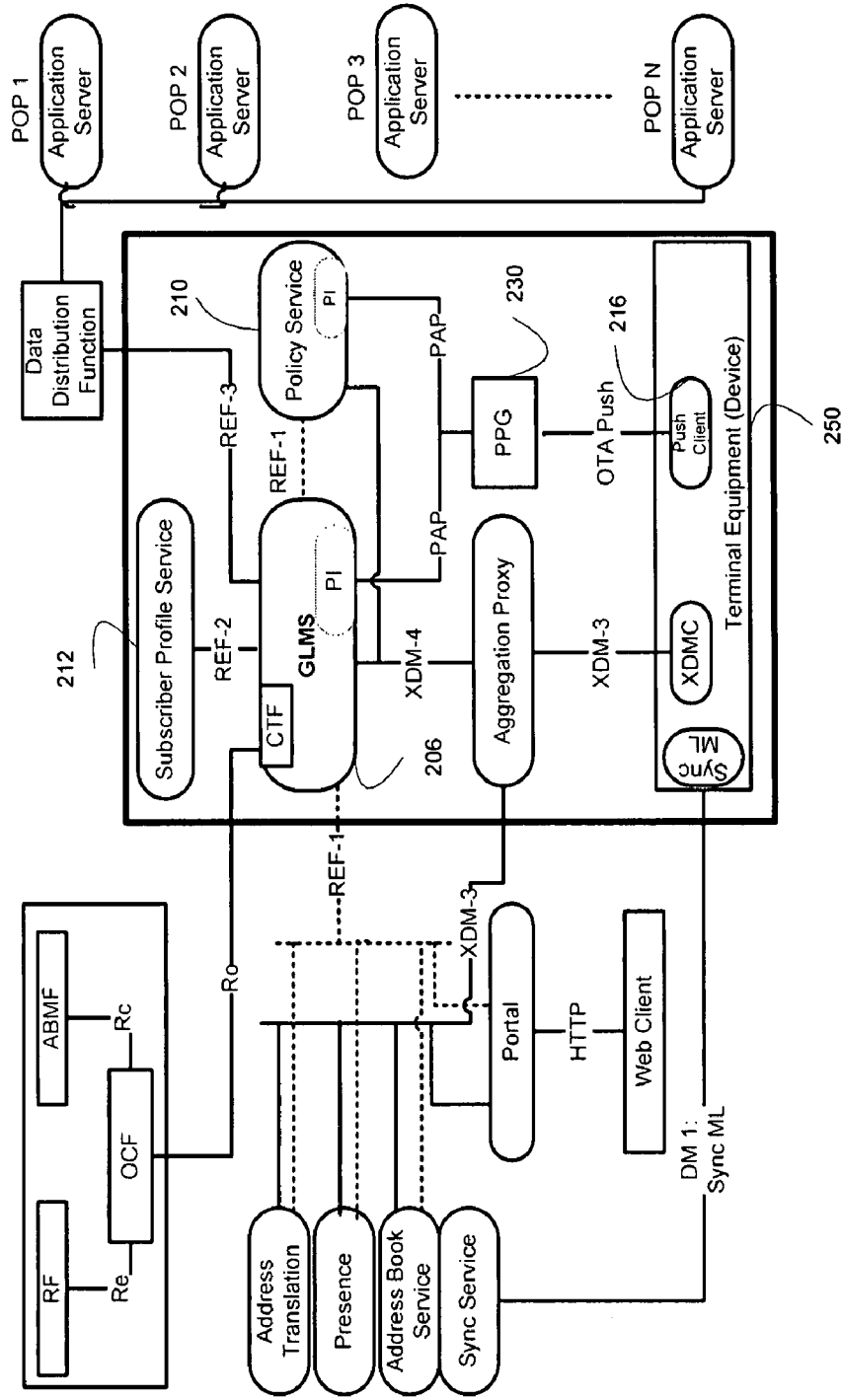
FIG. 2 illustrates a second exemplary group communications management architecture in accordance with the present invention.

FIG. 2 illustrates a second exemplary group communications management architecture in accordance with the present invention. The architecture of the second exemplary embodiment is based on the OMA XDMS specification, and is extended to support address book synchronizations, policy, group URI distributions, profile and portal interactions. The main difference from the architecture described above in connection with FIG. 1 is the elimination of the SIP Subscribe Notify interface and replacing that with a "Push Notification" interface. In this architecture groups can be managed both from a web portal (HTTP), mobile device (XCAP) and other application services using either a XCAP or a Web services API.

The XDM 3, XDM-4, REF-1, REF-2, REF-3 and DM-1 interfaces operate in the same manner as that described above in connection with FIG. 1. The Push Access Protocol (PAP), which interfaces between the Push Initiator and push proxy gateway 230 (PPG), and the OTA Push interface are different interfaces from those described above in connection with FIG. 1. The PAP interface uses the PAP protocol, and is independent of the underlying transport, i.e., it can be transported over virtually any protocol that allows MIME types to be transported over the Internet.

Most of the functional entities in the architecture illustrated in FIG. 2 are similar to those discussed above in connection with FIG. 1, and the new entities are described below.

A service provider has several applications that seek to "push" (i.e., send without a synchronous request) content to a device client (i.e., a push-compliant mobile device). This is in contrast to "pull" technology, which requires a synchronous request from the device client. Push to a device client is facilitated by PPG 230 between the wired and wireless networks. PPG 230 then uses over-the-air mechanisms to send the notification to the device client. PPG 230 provides notifications when an opt-in event is triggered, and pushes the group data and parameters to the device.

The push initiator initiates the push request using the PAP (Push Access Protocol). In the architecture illustrated in FIG. 2, GLMS 206 and policy service 210 act as a push initiator, and push client 210 on device 250 receives the push notifications from PPG 230.

Most of the system concepts of the architecture of FIG. 2 are similar to the system concepts of the architecture of FIG. 1, including GLMS discovery, authentication, security and encryption, Web services interfaces, policy service, subscriber profile service, opt-out, charging, synchronizations and application-specific GLMS functions. The main difference between the architectures of FIGS. 1 and 2 is the manner in which end-users subscribe to and are notified of group changes. The architecture of FIG. 1 employs SIP Subscribe/Notify, while the architecture of FIG. 2 employs WAP Push to notify users of group changes.

Since device 250 does not have a SIP Subscribe interface, user-defined (or configured) subscriptions to group changes and group event notifications are not supported in the architecture of FIG. 2. However, as a matter of local policy subscriptions to receive changes to the group data could be implemented including a limited set of subscriptions by indicating preferences in the policy profile managed by a network operator and/or administrator, e.g., a network operator configured global policy to notify subscribers (via PPG 230) of certain group related events. The lack of a user-defined interface from the device for managing subscriptions does not provide an elegant user experience, however, the architecture does provide a portal front-end that couples to the GLMS to provide some management aspects through a web client/browser. A web client on the terminal could also act as a device client to the portal to mange notifications, however, in this case the user has to subscribe to a "data" access plan in-addition to the terminals support of such a web client.

In the architecture of FIG. 2 users are notified of group events via PPG 230, wherein GLMS 206 and policy service 210 act as the Push Initiator. In order to receive notifications, the device client supports the OTA protocol, OTA-WSP or OTA-HTTP. Once the connection is established, it can be used to transport the push content from PPG 230 to device 250. Further, the device may have preferences for a TO-TCP connection or a PO-TCP connection establishment method. The OMA's Push OTA OMA-WAP-TS-Push OTA-V2-1-20051122-C specification, the entire contents of which are incorporated by reference, defines two methods for establishing an active TCP connection (i.e., a TCP connection to be used for push delivery). The methods are PPG Originated TCP (PO-TCP) and Terminal Originated TCP (TO-TCP). PO-TCP allows an active TCP connection to be established when the bearer is active (or can be activated by the PPG) and the terminal's IP address is known by the PPG. The TO-TCP method addresses other cases, and is usually used in combination with the Session Initiation Request (SIR) mechanism. As part of the push message submission, GLMS 206 or policy service 210 is aware of the device client capabilities that are included in the message. GLMS 206 can obtain this information from subscriber profile service 212. In the architecture of FIG. 2 notifications serve two purposes. The first purpose is notifications for opt-in (i.e., policy service initiated push), and notifications for group attributes (i.e., GLMS initiated push for the group data distribution).

In order implement opt-in support the subscriber (or the network operator) indicates this in a policy or configuration profile. Policy service 210 sends notifications to device client 216 via PPG 230 to get their explicit authorization. The receiving client acknowledges their participation in the group via regular XCAP procedures. The notification via PPG 230 contains sufficient information for the XCAP client to support the feedback process.

Another feature of the architecture of FIG. 2 is group data distribution, which is different from the data distribution service described above in connection with FIG. 1. The group data distribution allows GLMS 206 to send the group information to device clients via the push notifications, which is independent of the synchronization service. Accordingly, if some applications require the group data to be available on the device client before the group service can be invoked, GLMS 206 checks the user profile to see if the user has subscribed to synchronization service. If the user has not subscribed to the synchronization service, GLMS 106 acts as a Push Initiator and sends the information via PPG 230.

The technical areas and features of the architecture of FIG. 2 that are extensions to the conventional OMA XDM are similar to those described above in connection with the first architecture.

The architecture of FIG. 2 does not support the SIP Subscribe Notify interface so it is not possible for an end-user to subscribe to opt-in events or group changes events. However, as a matter of administrative policy the network operator could set default rules in GLMS 206 and policy service 210 that informs GLMS 206 that opt-in is required. GLMS 206 then interacts with policy service 210 that acts a "Push Initiator" to send notifications via the PPG, MMS, SMS, etc. Even though this process works by an administrator-defined policy there can be a self-managed mechanism by which a user could update the preferences e.g., if a user does not want to receive the notifications but wants to be still added to all groups by default. The XDM-3/XDM-4 interfaces supports this by allowing a user to upload personal preferences to policy service 210. The user can also upload personal preferences to policy service 210 via portal 132 using an HTTP interface.

When a user receives a notification through the PPG 230, MMS, SMS etc, the user can indicate the preference by uploading an XML document to policy service 210, which indicates the results of the opt-in process to GLMS 206 via the REF-1 interface. GLMS 206 maintains a transient state of the group membership responses to appropriately notify the group owner/creator. In the architecture of FIG. 2 the creator receives notifications when the participants accept or reject the group membership via the PPG/SMS/MMS. The notification of the new group URI could be done via the PPG, where the GLMS acts as a Push Initiator and sends this information in the notification.

The architecture illustrated in FIG. 2 is based on sub-set of OMA XDM standard and uses open protocols like XCAP, HTTP, and DIAMETER protocols that are developed by IETF. The architecture serves as a foundation for migrating to a fully OMA XDM compliant state. Applications requiring shared resource management e.g., VoIP conferencing, benefit from a centralized GLMS. Multiple applications may need to expand the group definitions and having a common service in the network that provides this makes the network architecture robust. The architecture provides freedom for the service specific components of GLMS 206 to perform custom operations e.g., the push-to-talk-specific GLMS needs to implement the push function where it needs to distribute the group definition to the call processing functions to avoid latency impacts.

Figure 3:
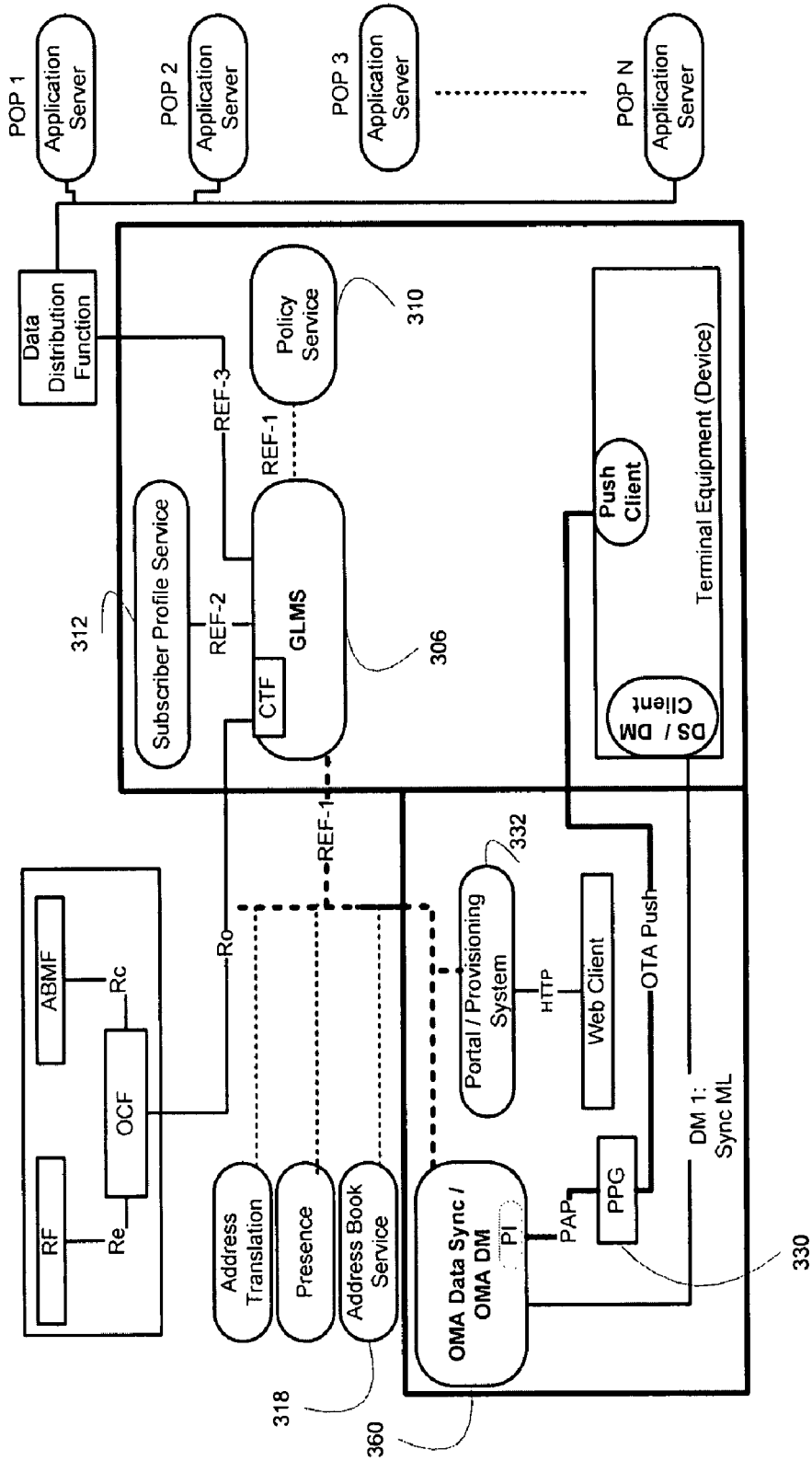
FIG. 3 illustrates a third exemplary group communications management architecture in accordance with the present invention.

FIG. 3 illustrates a third exemplary group communications management architecture in accordance with the present invention. Since the interfaces and functional entities in architecture of FIG. 3 are a subset of those described above in connection with FIGS. 1 and 2, a detailed description of these interfaces are not repeated here. FIG. 4 illustrates the OMA specifications tree for the Sync ML protocol. The specification is structured as one root element called "Common Specifications" and two child specifications, one for Data Synchronization and the second for the Device Management.

The OMA SyncML Common Specifications define the representations of the SyncML, the transport bindings for HTTP, OBEX and WSP, the meta-information and the server alerted notifications. The common specifications act as a foundation for both DS and DM implementations. Additional details are available in "OMA SyncML Common Specifications" V1.1.2, the entire disclosure of which is herein expressly incorporated by reference. The OMA Data Synchronization Specifications defines the specific protocol representations for data synchronization that allow the device client and server to exchange information and specific data objects like Email, File and Folder. Additional details are available in OMA SyncML Data Synchronization Specifications, the entire disclosure of which is herein expressly incorporated by reference.

The OMA Device Management Specifications defines the SyncML representation specific for device management that are used between the device client and the server to exchange information, the device management notifications, the three DM standard objects, which are: the Device Management Account Objects (DMAcc) for settings of the DM clients; the Device Info Objects (DevInfo) for the device information for the DM servers sent from the device client; and the DevDetail objects which contain other information that can be controlled by the DM Server but not sent automatically by the device client to the server. Additional details are available in OMA SyncML Device Management Specifications, the entire disclosure of which is herein expressly incorporated by reference.

Fundamentally, both DM and DS specifications use the same methods to achieve their individual tasks i.e., both rely on a Server Alert Notification (SAN) to alert the device client when the network sever has data to send and both use the SyncML protocol to transport data between the server and the device client. The differences lie in the standard object definitions and formats for the DS and the DM services. Since the underlying principles of these services are same, this architecture option considers them jointly and it depends on the implementation to either use the DM or the DS service for group management.

One of the key differences of the architecture of FIG. 3 as compared to the architecture of FIGS. 1 and 2 is the elimination of the SIP Subscribe Notify and XCAP interfaces. Lack of XCAP interface in architecture of FIG. 3, eliminates some flexibility of managing groups from the device, such as creating, updating, and retrieving group data. However, groups can be managed from a web portal (HTTP), by a customer agent, or by a designated administrator from an enterprise.

The basic functional entities for this architecture are GLMS 306, data synchronization or device management function(s) 360, policy service 310, subscriber profile service 312, portal provisioning system 332 and PPG 330. On the device side, the Push Client and the DM/DS Clients are included.

Portal/provisioning system 332 acts as a front-end system to GLMS 306, and is responsible for authenticating the user and interfacing with address book service 318 to present the users contacts (personal/corporate etc). The user can then choose various contacts to be part of the group.

GLMS 306 is the central core entity in the architecture, and the major functions have been described above in connection with the architecture of FIG. 1. The main deviations to the functions are described below. GLMS 306 does not provide any notification functions to the subscribers directly, but instead informs the data synchronization/device management service 360 of the group via a web services API and then those services are responsible for sending the group definition to the device by sending a notification on the OTA Push interface and synchronizing the group definition on the DM-1 Sync ML interface.

Policy service 310 is responsible for authorizing requests and applying any privacy rules to the response. This service provides a common store for user preferences and manages policy documents. If there are global policies that are provided by the service operator, they may take precedence over individual policies. The service provider or operator can upload policy documents via the REF-1 interface. GLMS 306 collaborates with policy service 310 to ensure proper authorization of the requests. The level of collaboration depends on how the policy service is implemented in the network.

Another implementation could involve portal/provisioning system 332 interacting with policy service 310 directly and authorizing the group operation request before sending it to GLMS 306. In this implementation GLMS 306 is limited to ensuring global uniqueness of the group identifier, storing the group definitions, interacting with the address translation service (if required) and interacting with DM/DS services 360 to distribute the group definitions. If portal/provisioning systems 332 have already authorized the request, then it tags the request in the API call to GLMS 306 to inform the GLMS that the authorization has already taken place.

The optional functional entities in this architecture are the charging functions, data distribution function and the address translation services.

The three architectures described above are merely exemplary, and the present invention can be practiced using other architecture. For example, SMS, MMS and WAP can be used to interact with the user and provide notifications.

The GLMS also includes other interfaces (not illustrated) for OSS support such as for provisioning, ODBC for specific DB Access, EMS interface for alarming etc.

As an evolution plan for an initial deployment the GLMS, policy and aggregation proxy services could be implemented as a single system. From the policy enforcement perspective the policy documents could initially be handled by the GLMS but as the policy function evolves to provide authorizations across the services and applications layer the user preferences and policy document management can be moved to that function. Since the present invention provides two separate SIP Subscribe event packages, i.e., the "auth" and "group" events, there would be no impact on the device side. The network can take care of resolving/routing the different SIP messages without any action from the device client, which will ease the migration to an independent policy function.

Similarly, if there are no other document management servers then the aggregation proxy could be implemented as part of the GLMS service, and as additional list services (document management servers) are deployed the aggregation proxy services could move out of the GLMS.

Figure 5A:
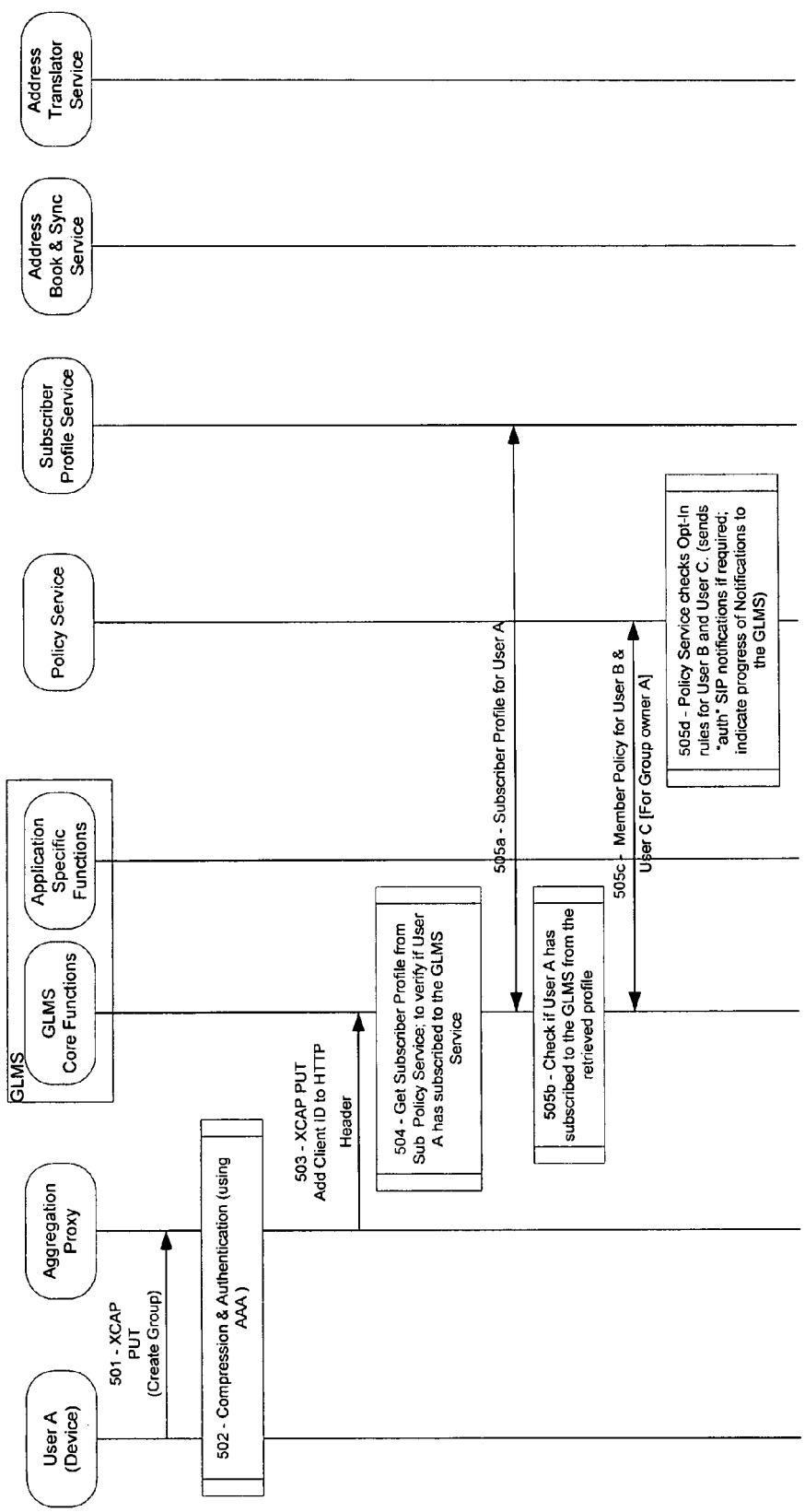
FIGS. 5a-5c illustrate call flow diagrams of an exemplary method for creating a new group in accordance with the present invention.
Figure 5B:
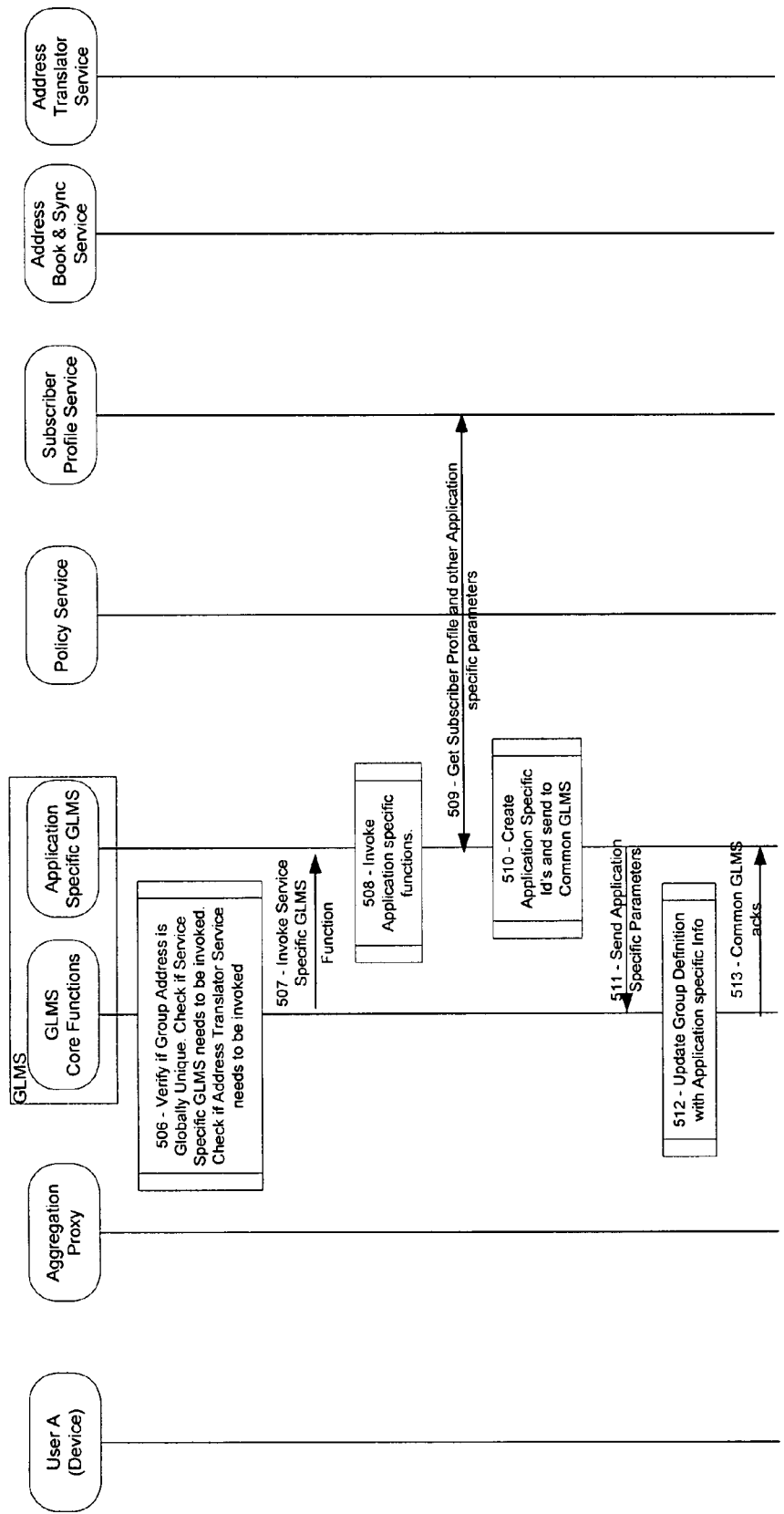
Figure 5C:
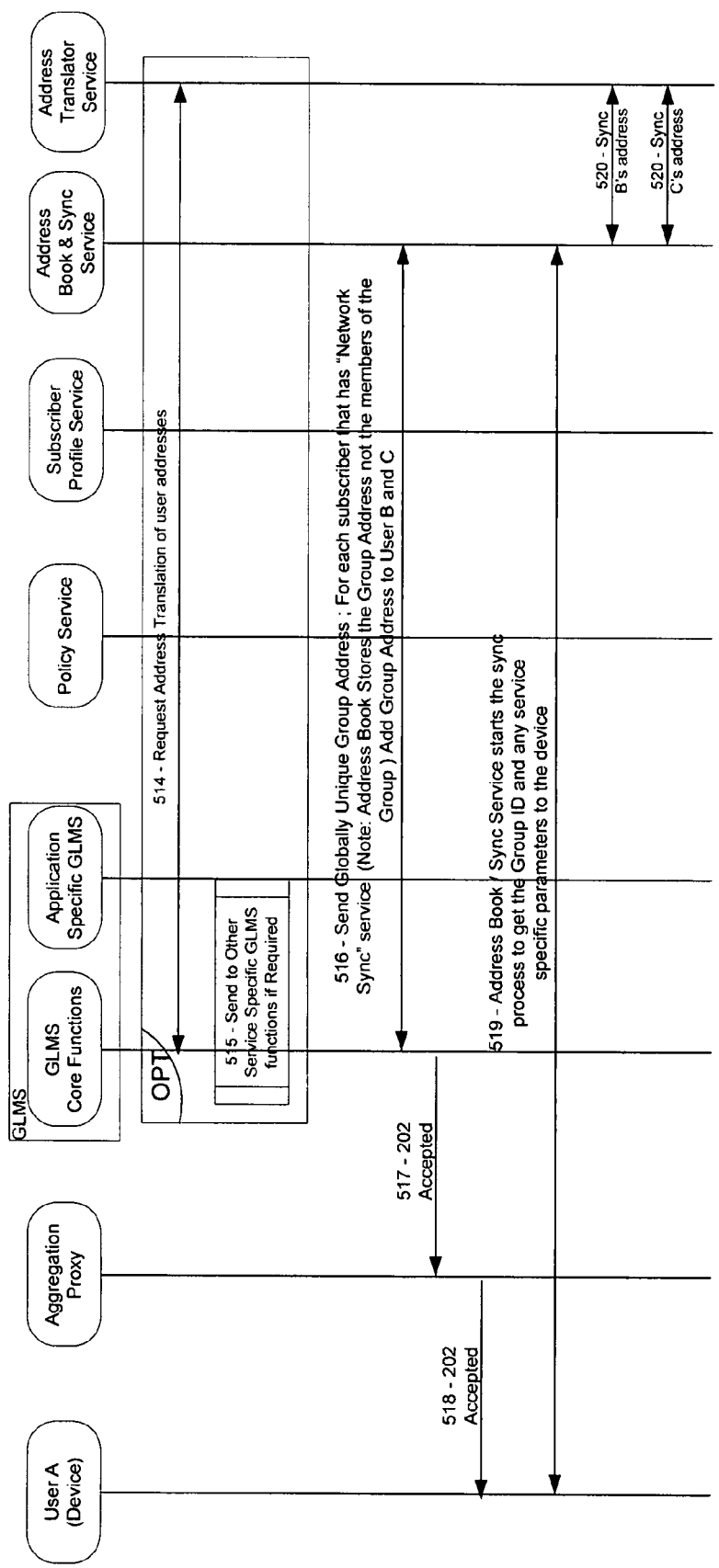

FIGS. 5a-5c are call flow diagrams of an exemplary method for creating a new group in accordance with the present invention. The call flow illustrates how a closed group can be created from a user terminal (with a XDMC). User A creates a closed group that has B and C. The group definition is distributed to B and C via SyncML Interfaces. In FIGS. 5a-5c, User A is the group creator, and Users B and C are group members.

The call flow illustrated in FIGS. 5a-5c assumes that a closed group does not exist and User A has the necessary authorizations to create the group. This call flow also assumes that Users B and C have the address book synchronization service, and users B and C have disabled their notification for opt-in functionality. Upon completion of the processes illustrated in this call flow a group is successfully created and the group address and other parameters are distributed to the members, via the SyncML.

User A, through the device GUI (address book/contacts), selects Users B and C to include them in a closed group. User A chooses a name for the group and the device client sends this request to the network via the GLMS client in an XCAP PUT request (Step 501). Through previous configuration and via the GLMS discovery process the XDM client/agent has learned of the aggregation proxy addresses and sends the XCAP Put method incorporating the group definition in the HTTP body.

The aggregation proxy authenticates the device client, which is dependent upon the particular implementation (Step 502). For example, the device client could be authenticated by the IP layer before the request reaches the aggregation proxy, by the GAA 3GPP architecture if it is in place, or automatically by the credentials stored in the device. The aggregation proxy then forwards the XCAP PUT request to the GLMS (Step 503). The aggregation proxy uses the AUID of the GLMS that is in the request as a routing address. Further, the aggregation proxy adds the device client asserted identity header in the HTTP request, this header including the device client's unique identifier.

The GLMS verifies if User A has subscribed to the GLMS Service, by requesting User A's profile from the subscriber profile service (Step 504). This can be performed using Web services/SOAP, Sh or other protocol, depending on the implementation. The subscriber profile service gets the request and returns User A's profile to the GLMS (Step 505a). If the profile indicates that the user has subscribed to the GLMS service, then the GLMS proceeds to get authorization from the policy service for the group members (User B and User C) (Step 505b). The GLMS sends the group creators' identity, group name and the members of the group (User B and User C) to the policy service (Step 505c).

The policy service checks the opt-in rules for each user and, if required, sends them the SIP "auth" event notifications (Step 505d). The notification body at a minimum includes the group creator and the group name. As the notified users respond to the policy service, the policy service provides feedback to the GLMS via the REF-1 interface. The GLMS waits for the first positive response from the policy service before any further steps are executed. If the opt-in process takes long time the GLMS can respond to User A with a progress code e.g., 202 Accepted.

If the user is authorized to perform the group operations then the GLMS determines if the Group ID is globally unique (Step 506). If it is not unique the GLMS could be configured to recommend a unique group identifier to the user or can return an error to the user. Depending on the request, GLMS will determine if some service specific actions need to be performed, i.e., invoking a service specific GLMS service. Furthermore, if the network still supports addressing using non-SIP URLs, then for those specific applications the GLMS constructs a different instance of the group that has a different addressing format.

This call flow shows the GLMS invoking the application-specific function (Step 507). As indicated above, the "service specific" functions could be in the same physical network element as a separate software plug-in module or could be implemented as a separate network element. In this sample call flow, the application-specific functions services the request from the common GLMS core (Step 508).

The application-specific function may need an additional subscriber database and profiles which it can obtain from the subscriber profile service (Step 509). The subscriber profile service can be a HSS, CDM-E or a virtual data broker that a network operator may deploy. In this example the message contains a profile request for User B and User C; User A's profile is already available in Step 507 so there is no need to request it again.

The application-specific function creates the application-specific group ID's based on application-specific parameters like preferred vocoder, region ID, etc., and invokes the data distribution function to upload the data to the application servers (Step 510). The application-specific function then sends the application-specific group parameters to the common GLMS for storage (Step 511). If the application-specific function is an XDM server then it may optionally store its own documents, and when implemented as a plug-in software module extension then this step can be a function call back to the main processing logic. The GLMS updates the group database with the application-specific functions (Step 512). Upon a success in step 512, the GLMS acknowledges step 511 (Step 513).

Steps 514 and 515 are optional. Step 514 is implemented when the GLMS needs to interact with the address translation service to get the application-specific address for each user. The interface to invoke the address translations could be an API call to the address translator service. Alternatively, application-specific addresses may be provided by the device client in step 503, and in this case steps 514 and 515 are not required. When the GLMS receives the translated address for the complete member list it may need to invoke a service-specific function to process those identities (Step 515).

If Users B and C have subscribed to network-based synchronization service, then the GLMS invokes the address book service to send the users device client the group identifier and parameters (Step 516). If the Users B and C have not subscribed to the network-based address book, then they would have to subscribe to the "group" event package so that the GLMS can notify them of the group.

The GLMS sends the HTTP response to the initial request to the aggregation proxy server (Step 517). The HTTP 202 message is shown here as an example, and it could be HTTP 200 OK message instead. The aggregation proxy forwards the response to User A's device (Step 518). It should be noted that User A's device should synchronize the address book to the network-based server. The network-based address book service synchronizes the address book of Users B and C to one or multiple devices based on their profile settings (Steps 519 and 520).

Figure 6:
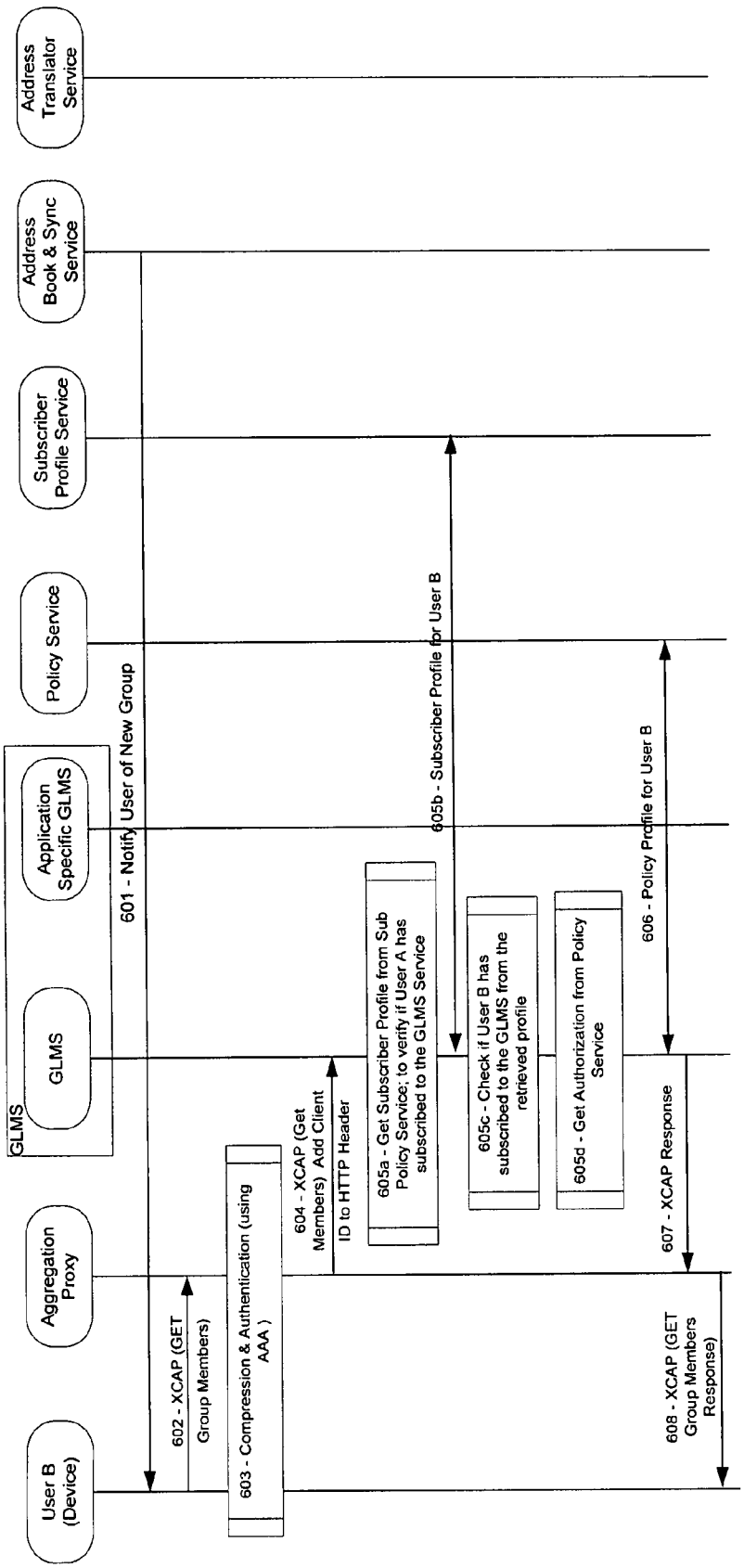
FIG. 6 illustrates a call flow diagram of an exemplary method for retrieving members in a group in accordance with the present invention.

FIG. 6 illustrates an exemplary call flow diagram of a method for retrieving members in a group in accordance with exemplary embodiments of the present invention.

The call flow assumes that User B's device has resolved the address of the GLMS through the DNS procedures, which will resolve to the aggregation proxy's address.

After completion of this call flow procedure, User B obtains the group members from the network. If the group list is large then the user interface can display a reduced set with an option to display more. The list could be presented to the user based on user settings like alphabetically, etc. Further, assuming a sample group size of 2,000 members, and each member's address is 50 bytes, the XML padding is another 30 bytes, a total of 80 bytes is required for each member. For a 2,000 member group it would be a 16 KB data payload. If the aggregation proxy compresses it then it would be shorter. When devices are EV-DO A capable, throttling probably need not occur at the server, rather the device can render it appropriately.

Initially, User B is notified of a new group. This notification could either be through a SIP Notify due to a previous subscription to group events or through the group synchronization process via the network address and synchronization services. Although the call flow illustrates notifications from the address book synchronization service, this could be a notification via SIP Notify or in case of public group User B could have retrieved the group name from a portal (Step 601). The user interface of User B's device presents a soft key for the user to get the group members. After the user presses the soft key, the device then sends the XCAP Get method to the aggregation proxy (Step 602). If the device does not know the AUID of the application a default AUID could be used in the Request URI. The aggregation proxy performs the necessary authentication and compression negotiation (Step 603) and forwards the request to the GLMS (Step 604). The XCAP AUID could be a default AUID.

The GLMS determines if access to the XML group document requires authorization. If an explicit authorization is required, then the GLMS collaborates with the policy service (Steps 605a-d). The GLMS obtains the policy for User B to ensure that he/she is authorized to receive member list of the requested group (Step 606). The GLMS sends the HTTP 200 OK to the aggregation proxy that contains the group as an embedded MIME body (Step 607). The aggregation proxy sends the response, after optionally compressing, it to User B (Step 608).

Figure 7:
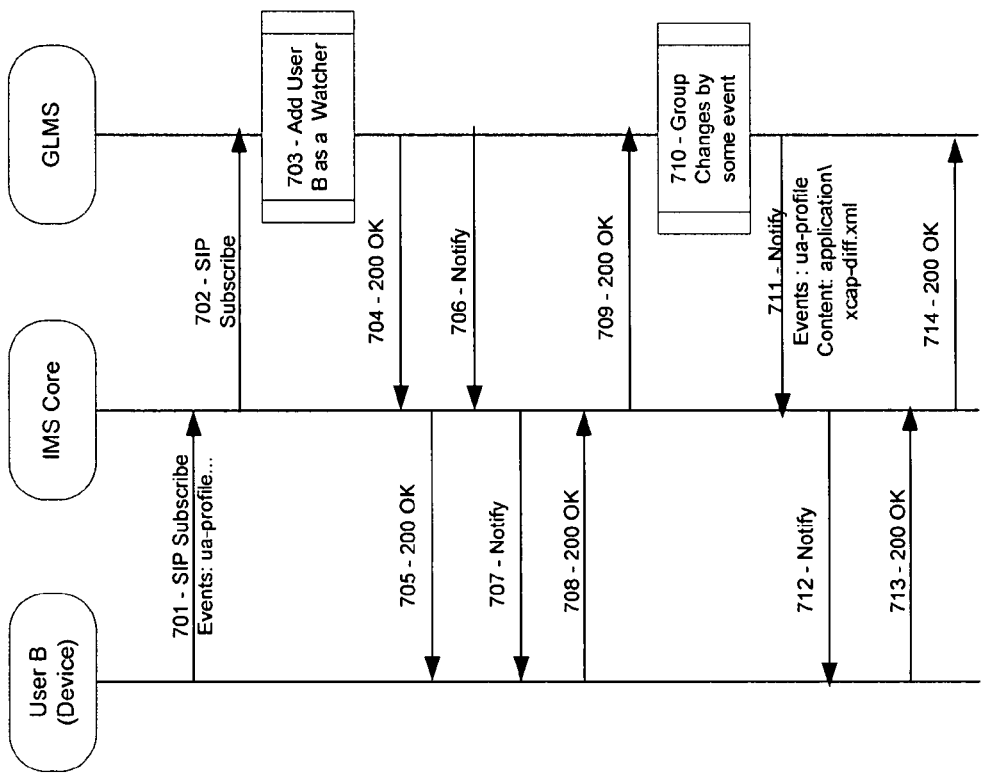
FIG. 7 illustrates a call flow diagram for an exemplary method for subscription and notification of changes to group definitions in accordance with exemplary embodiments of the present invention.

FIG. 7 illustrates an exemplary call flow diagram for subscription and notification of changes to group definitions. Generally, this call flow involves User B who is a member of a group and would like to be notified of changes to group definitions that he/she belongs to. User B, through the user interface, selects this option via a soft key. The device has the appropriate event header parameters such as document name, application name, etc. GLMS stores the group documents and supports SIP Subscribe for document changes. The IMS Core (if present) is responsible for routing the SIP messages to the GLMS. The IMS core also provides the functions of device client identity assertion when present. If the IMS core is not present then some SIP Proxy in the network is delegated that task.

The call flow assumes that User B's device knows the event header parameters. Normally these parameters would be sent to the device with the group information. It also assumes that the device, for over-the-air optimizations, supports the xcap-diff.xml MIME bodies, so that the device can get document deltas rather then complete documents. The device should use any preconfigured SIP Route header parameters if it has them. Upon completion of this call flow, the device obtains a notification immediately after the first subscription and subsequent notifications whenever the document changes.

User B's device sends the SIP Subscribe (with the appropriate event header parameters) to the IMS core (Step 701). The IMS Core asserts the identity by adding appropriate headers in the SIP Subscribe message, and forwards the SIP Subscribe to the GLMS (Step 702).

The GLMS adds the user to the watcher database (Step 703). When policies are associated with a group vis-á-vis subscriptions, the GLMS checks the group policies and responds with an appropriate error messages if subscription is not allowed. Optionally, if subscription to group changes is a paid service, the GLMS can collaborate with policy service to ensure that User B is authorized to subscribe to notifications of group changes.

The GLMS sends a 200 OK message to the IMS core to acknowledge the subscription request (Step 704). The IMS core sends the 200 OK to User B's device (Step 705). The GLMS sends a Notify message as per RFC 3265 to the IMS Core (Step 706) and the IMS core forwards the Notify message to User B's device (Step 707). User B's device sends a 200 OK message (for the Notify) to the IMS Core to acknowledge the reception of the notification (Step 708), and the IMS core sends the 200 OK to the GLMS (Step 709).

When a group owner, a member or an administrator modifies the group (Step 710), the GLMS sends the Notify message to the IMS core to communicate the modification to the group (Step 711). The modification of the group could also be due to some feature logic in the GLMS, such as automatic resumption of a members' "suspend" status to "active" e.g., after vacation, corporate group becoming active at 8:00 AM in the morning, etc. The GLMS may subscribe to the user's registration state using the "reg" event package as per IMS rules for efficient Notification e.g., send a Notify only when the user is active.

The IMS core forwards the Notify message to User B's device (Step 712). User B's device sends a 200 OK message to the SIP Core to acknowledge the reception of the group change notification (Step 713). The IMS core forwards the 200 OK message to the GLMS (Step 714).

FIGS. 8a-8c and 9a-9c are call flow diagrams of exemplary methods for providing opt-in support for groups. When a person creates a group, prior authorization may be required from the group members before they can be included in the group. This model is called the opt-in model. Members can set their default preferences in a policy service, and are required to subscribe to such events so that the network can notify them of such events. In this scenario, the group definition is not activated until at least one member opts into the group. Other members of the group could have the attributes of "Pending Notification", "Notified", "Suspend" and "Rejected".

The present invention provides two alternatives for opt-in. In Option 1 (FIGS. 8a-8c), the user that wants to be "consulted" subscribes to the GLMS with SIP Subscribe and the custom event header called "auth" (authorizations). The GLMS acts as an enforcement point and the policy service provides the necessary policy documents. The advantage in this option is that the policy service does not have to support SIP and the implementation is straightforward since the GLMS already has to support SIP (for group changes). In Option 2 (FIGS. 9a-9c) the user subscribes directly with the policy service using SIP Subscribe and the custom event header call "auth" (authorizations). The policy service is responsible for obtaining user feedback and informing other services of the decision.

From the architecture perspective Option 2 is provides flexibility of reuse across other services and applications. Moreover, users do not have to explicitly subscribe with individual enablers for opt-in events. The policy service becomes the central point for all authorization requests and other services interact with the policy service.

Figure 8A:
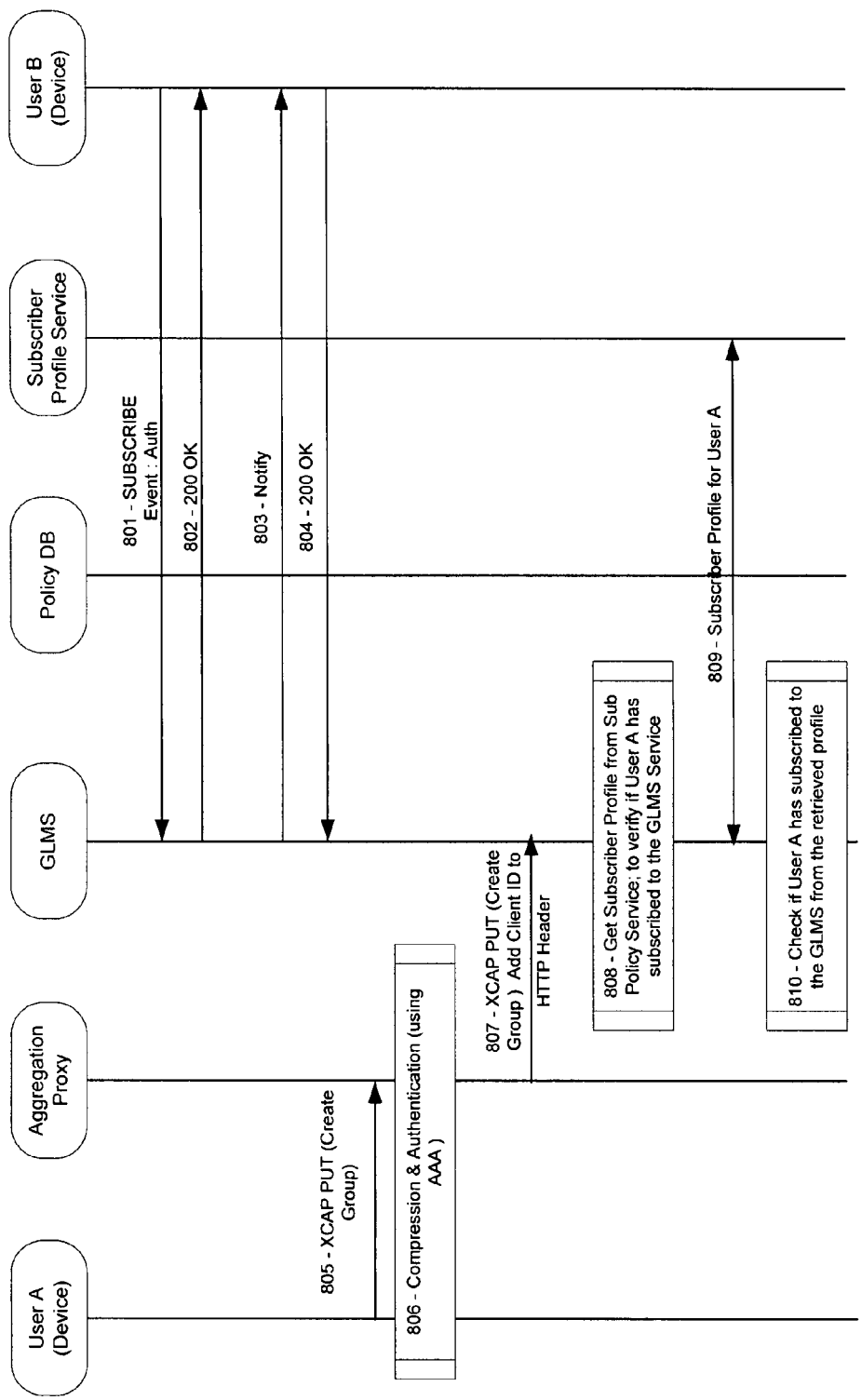
FIGS. 8a-8c illustrate call flow diagrams of an exemplary method for providing opt-in support for groups in accordance with one aspect of the present invention.
Figure 8B:
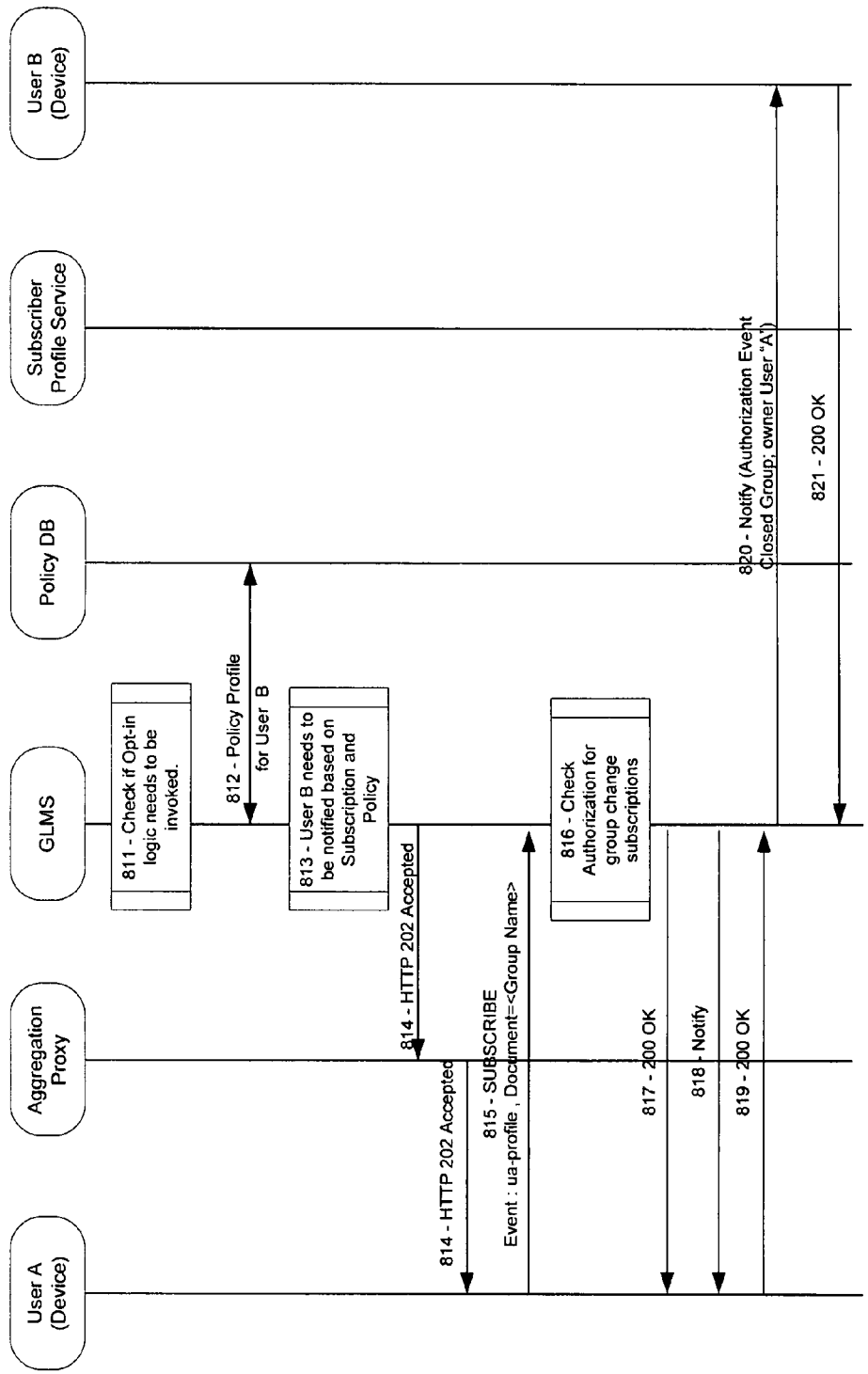
Figure 8C:
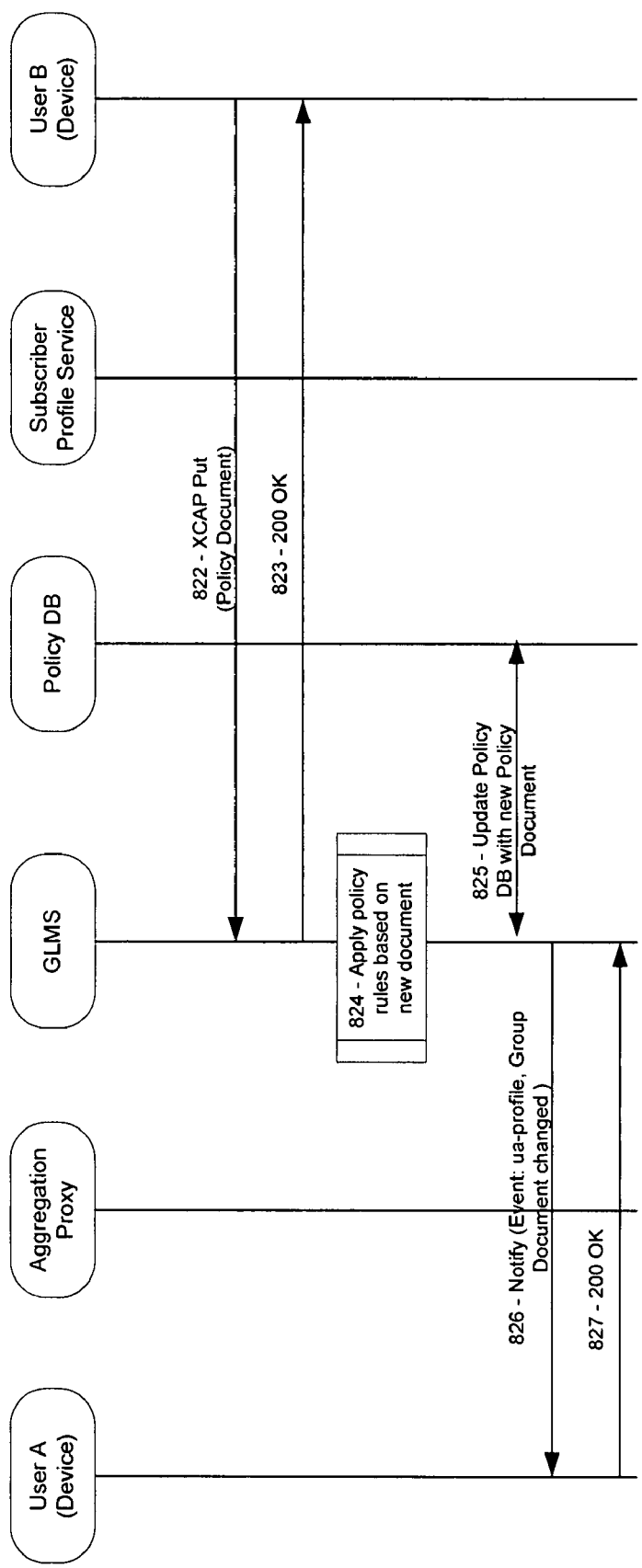

In FIGS. 8a-8c, User A is a user who wants to create a group that has User B and other members, and User B is a user who has set preferences to get explicit notifications for all groups in which the user is made a member. The aggregation proxy provides the necessary XCAP routing, authentication and compression services. The GLMS provides the intrinsic group service within the network.

In Option 1 the policy database is a database store for the user preferences, and can be an XDM Server. In Option 2 the policy service provides the policy decision point as well as storing the user preferences. If the policy service is an XDM sever that stores user preferences in the form of XML documents then it is accessed via the aggregation proxy. The subscriber profile service stores the subscriber profile, device capabilities or other data this could be an HSS, CDM-E etc.

The method of FIGS. 8a-8c assumes that User A has subscribed to group changes. This allows User A to get feedback of the members opt-in progress and status. If the group being created is large, e.g., 2000 members, then the notifications can be aggregated and sent based on some timer (e.g., every 10 minutes) or event counters (e.g., every 100 events). After completing these procedures the group is created successfully. User B uploads a policy document so that additional future requests from User A does not require explicit authorizations from him/her.

User B subscribes to the GLMS for "auth" events using SIP Subscribe (Step 801). The GLMS sends a 200 OK message to User B (Step 802). If subscriptions to the "auth" event are a paid service then the GLMS ensures that the subscriber is allowed to perform the required subscriptions. The GLMS interacts with the subscriber profile service to determine if the user is allowed to subscribe to opt-in events.

The GLMS sends an immediate Notify as per RFC 3265 (Step 803). The immediate SIP Notify message indicates that the subscription has been successfully created in the network element. The Notify also contains other headers like the expires header that indicates the life of the subscription.

User B's device responds with a SIP 200 OK message to acknowledge the receipt of the Notify message (Step 804). User A requests that the GLMS create a group. The request is sent using XCAP PUT to the aggregation proxy (Step 805). The XDM aggregation proxy performs the required authentication (Step 806). Upon successful authentication of the user, the aggregation proxy forwards the request to the GLMS (Step 807). It includes the necessary device client asserted headers in the request.

The GLMS then performs the necessary authorization check to ensure that User A is allowed to create groups (Step 808). The GLMS obtains User A's profile from the subscriber profile service (Step 809), which has subscription attributes that indicate that User A is subscribed to the GLMS service (Step 810).

The GLMS determines if the opt-in process needs to be invoked (Step 811). The GLMS retrieves User B preferences from the policy database (Step 812). The policy document for User B indicates that the user needs to be notified before being added to the group (Step 813). The GLMS checks to see if the subscription for User B exists. If no subscription exists then the user attribute will be set to "pending notification" state.

The GLMS responds with a HTTP 202 message to indicate that the group creation request has been accepted and is being processed (Step 814). On receipt of the 202 HTTP responses the client in User A's device prepares a SIP SUBSCRIBE message to get notifications for group changes (Step 815). The GLMS checks the policy rules to ensure that the subscription to the group changes are allowed (Step 816). The GLMS acknowledges the receipt of the Subscribe message by sending a SIP 200 OK message (Step 817). The GLMS sends a SIP Notify message to the device as per IETF RFC 3265 (Step 818). The device responds with a SIP 200 OK message (Step 819).

The GLMS notifies User B of the "auth" event, and a customized MIME body is included to indicate the group owner (User A), group name and optionally other members (Step 820). Due to privacy or other reasons the member list might not be included. User B's device acknowledges receipt of the notification with 200 OK message (Step 821).

User B is ready to respond and the user uploads a XML document that indicates the response (Step 822). This could be a one time authorization for that specific group or User B could optionally have a global policy document where all requests from User A are automatically accepted. The GLMS acknowledges the receipt of XML document of step 814 with a HTTP 200 OK message (Step 823). The GLMS then applies the policy rules based on the new document to the group created by User A (optionally to all future groups created by User A that includes User B) (Step 824). The GLMS then updates the policy database with the new document (Step 825), and notifies User A of User B's response (Step 826). This notification can be delayed and sent after a pre-determined number of members have responded. The device acknowledges the receipt of the Notify by sending a 200 OK message (Step 827).

Figure 9A:
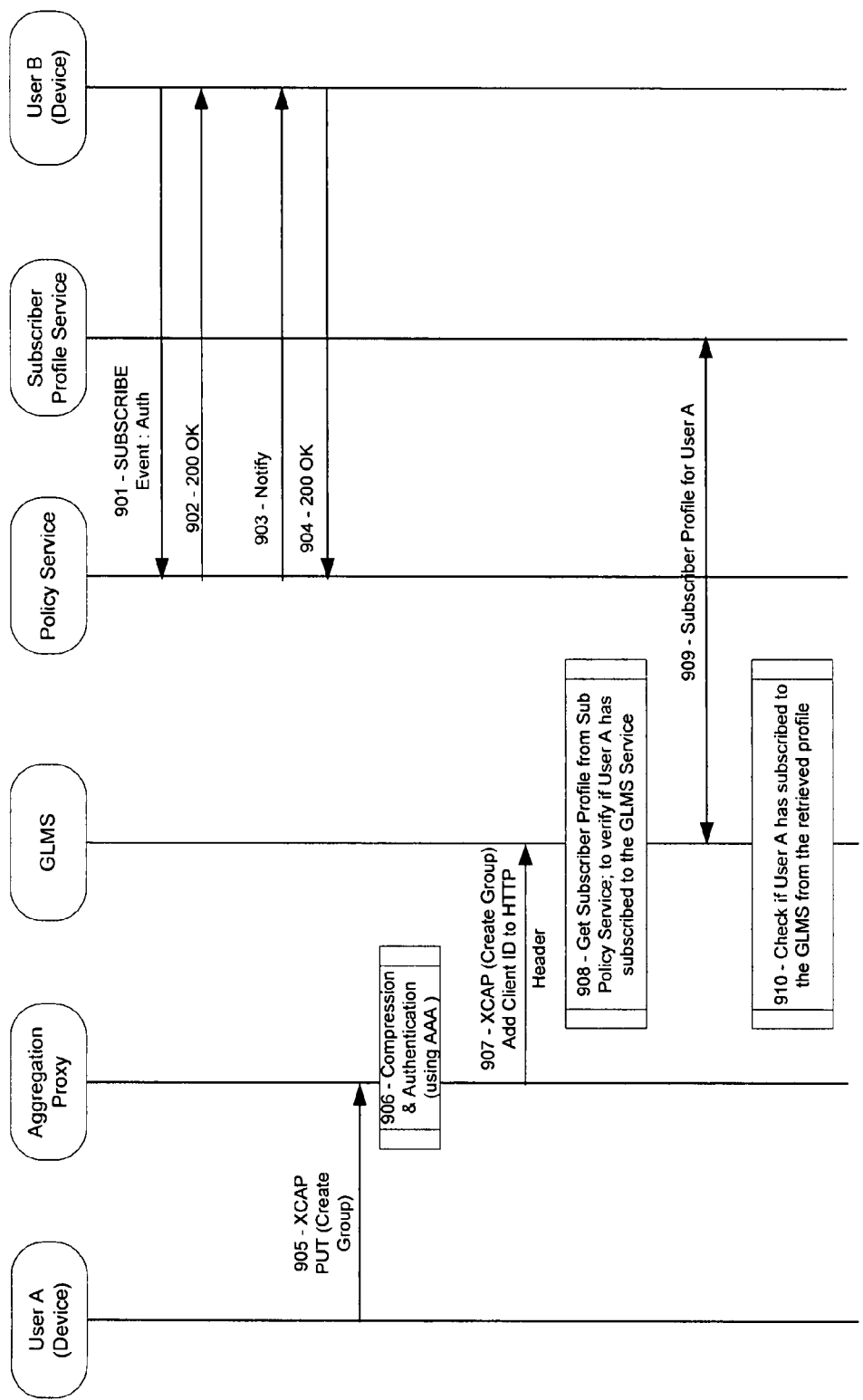
FIGS. 9a-9c illustrate call flow diagrams for an exemplary method for providing opt-in support for groups in accordance with another aspect of the present invention.
Figure 9B:
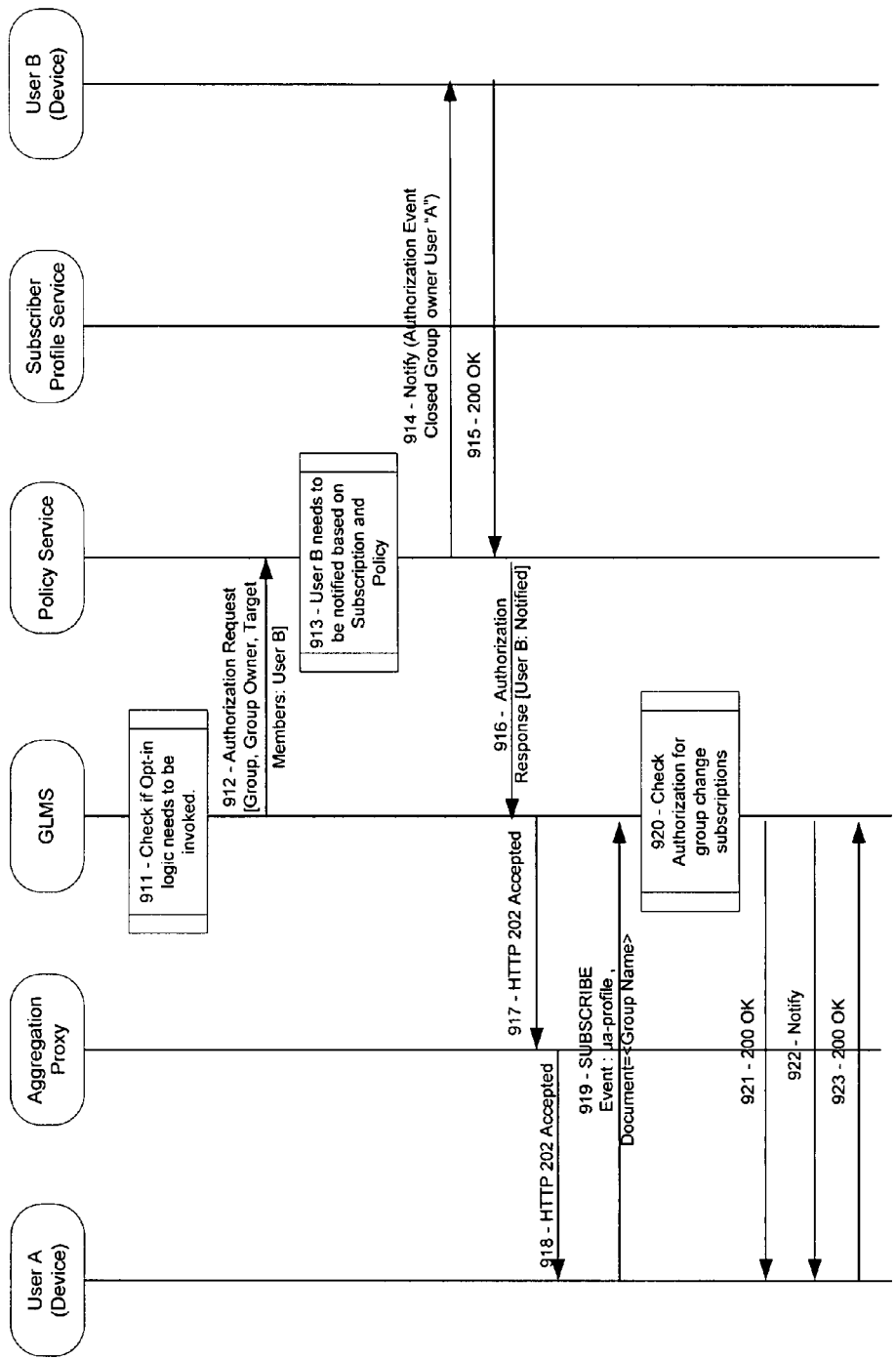
Figure 9C:
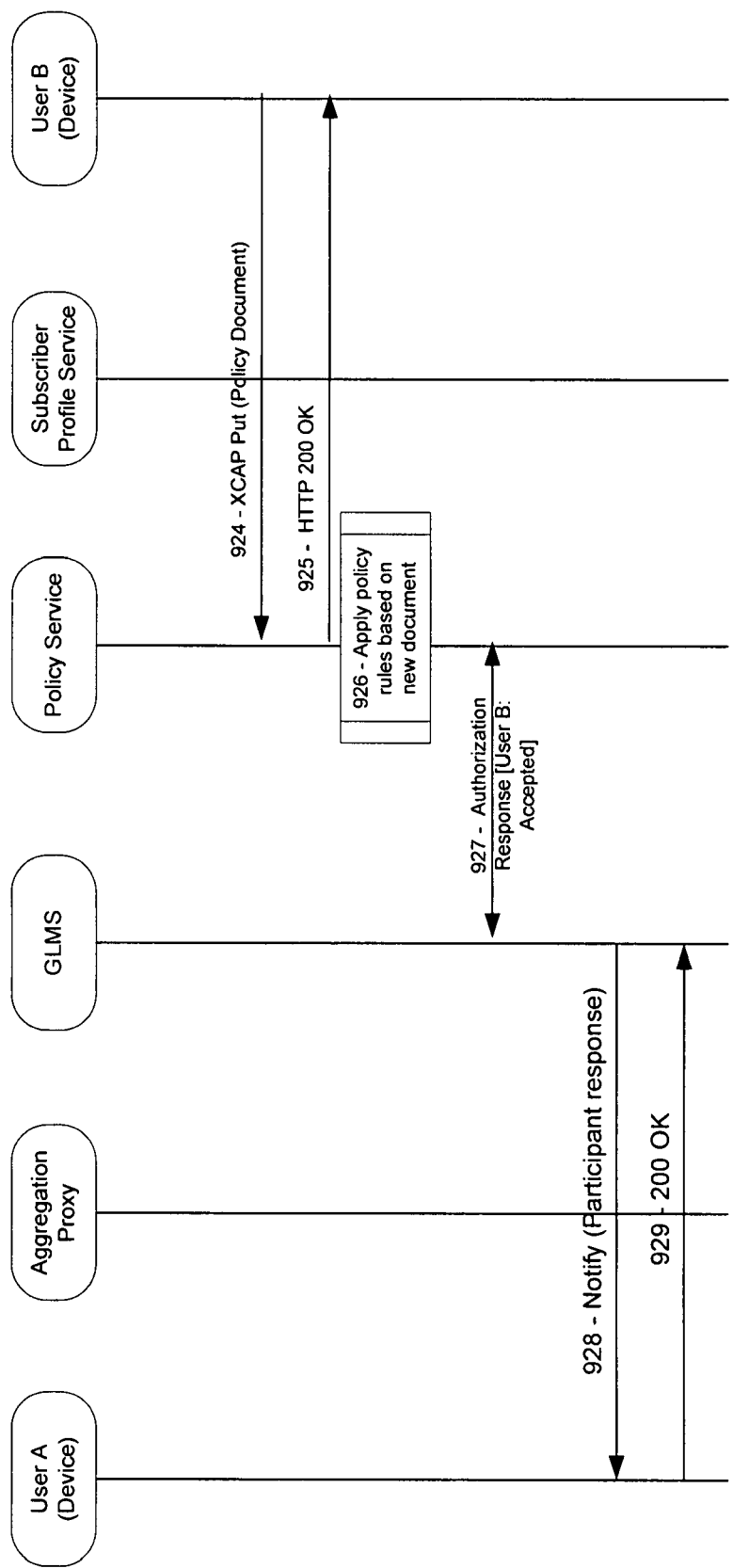

FIGS. 9a-9c illustrate exemplary call flow diagrams of an exemplary method for providing opt-in support for groups in accordance with another aspect of the present invention. In this method the policy service provides the decisions regarding some of the group-related operations.

User B subscribes to the Policy Service for "auth" events using a SIP Subscribe message (Step 901). Upon verifying authorization, the policy service acknowledges the subscription with a 200 OK message (Step 902). If subscriptions to the "auth" event are a paid service, then the policy service ensures that the subscriber is allowed to perform the required subscriptions. The policy service interacts with the subscriber profile service to determine if the user is allowed to subscribe to opt-in events.

The policy service sends an immediate Notify as per RFC 3265 (Step 903). The immediate SIP Notify indicates that the subscription has been successfully created in the network element, the Notify also contains other headers like the expires header that indicates the life of the subscription. The device acknowledges the notification with a SIP 200 OK (Step 904).

User A sends a request to the GLMS to create a group using XCAP to the aggregation proxy (Step 905), and the aggregation proxy authenticates the incoming request (Step 906). Upon successful authentication, the aggregation proxy forwards the request to the GLMS (Step 907). The GLMS determines that authorization is required and sends a request to the subscriber profile service to receive authorization (Step 908).

The GLMS sends a message to the subscriber profile service and retrieves the profile of User A (Step 909). Using the subscriber profile the GLMS checks for the subscription flags that indicate if group operations are allowed (Step 910). Depending on the XCAP request the GLMS verifies if the opt-in logic needs to be invoked (Step 911). The GLMS sends an API request to the policy service, the request including the group identifier, the group owner and the target members that need to be added to the group (Step 912).

The policy service obtains the user preferences from the internal policy databases. The policy document for User B indicates that the user needs to be notified before being added to the group (Step 913). The policy service determines if the subscription for the User B exists. If no subscription exists then the policy service responds to the GLMS indicating the notification to the user is still pending and the GLMS sets the user attribute to a "pending notification" state.

The policy service notifies the user of the "auth" event, and a customized MIME body will be included to indicate the group owner (User A), group name and optionally other members (Step 914). Due to privacy or other reasons the member list might not be included. User B responds with a 200 OK message to the notification (Step 915). The policy service responds to the GLMS with a response that includes the progress of the member notifications process (Step 916). The GLMS sends an HTTP 202 response to User A (Steps 917 and 918).

On receipt of the 202 HTTP responses, the client in User A's device prepares a SIP SUBSCRIBE message to get notifications for group changes (Step 919). The GLMS checks the policy rules to ensure that the subscription to the group changes are allowed (Step 920). The GLMS acknowledges the receipt of the Subscribe message by sending a SIP 200 OK message (Step 921). The GLMS sends a SIP Notify message to the device as per IETF RFC 3265 (Step 922). The device responds with a SIP 200 OK message (Step 923).

When User B is ready to respond, the user uploads the XML document that indicates the response (Step 924). This could be a one time authorization for that specific group or User B could optionally have a global policy document where all requests from User A are automatically accepted. The policy service responds with a HTTP 200 OK message (Step

925). The GLMS applies the policy rules based on the new document (Step 926). The policy service sends an authorization response that indicates that the requests from User B has been accepted (Step 927). The GLMS also notifies the group owner of the group changes (Step 928), and the device sends the SIP 200 response (Step 929).

Figure 10:
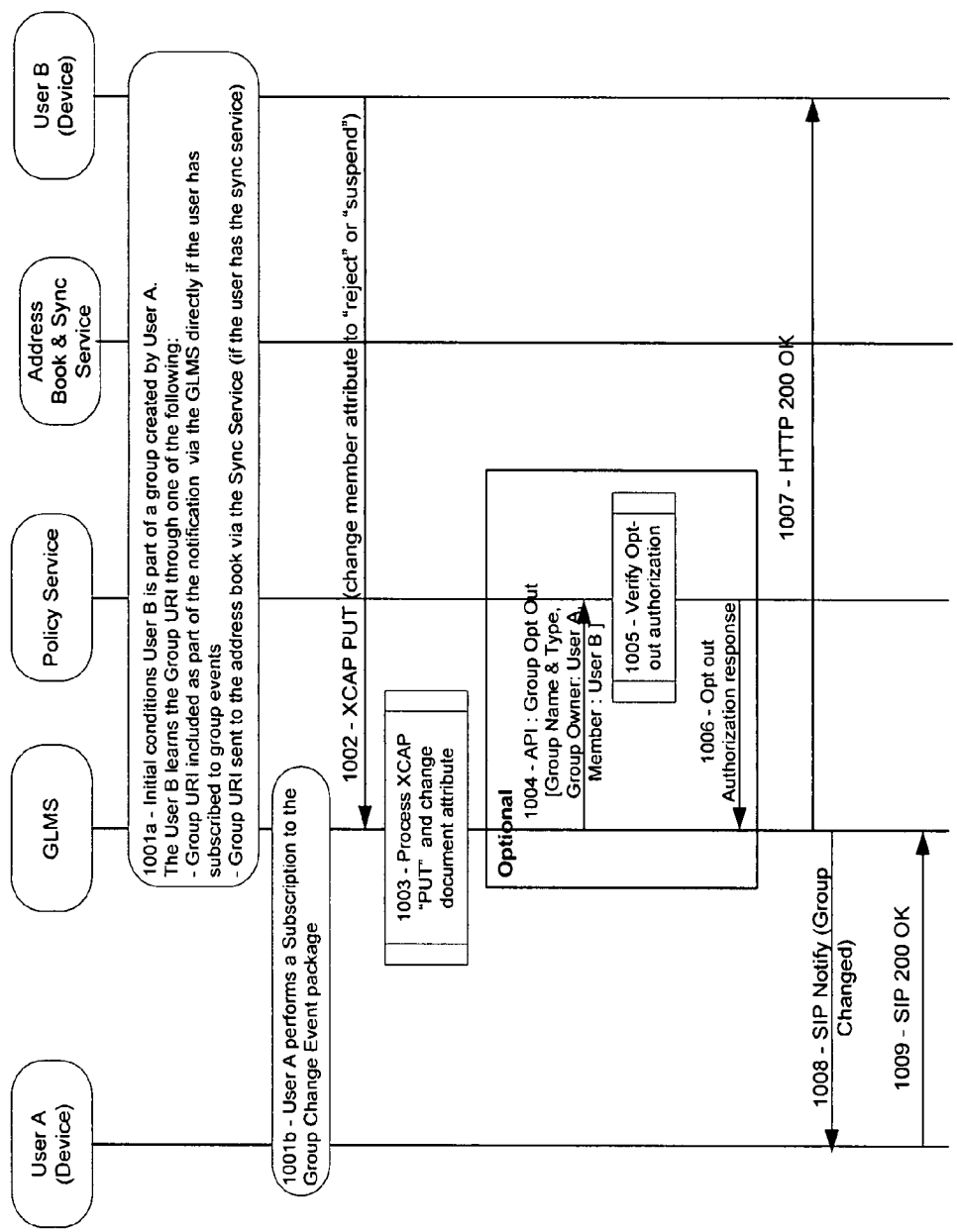
FIG. 10 illustrates a call flow diagram for an exemplary method of providing opt-out support in groups in accordance with the present invention.

FIG. 10 illustrates an exemplary call flow diagram of methods for opt-out support in groups. When a user does not want to be part of the group either temporarily or permanently the user has the ability to opt-out of the group, this user action is termed as opting out.

In the method of FIG. 10, User A is the group owner and User B is a group member who would like to opt-out of the group. The address book and synchronization service and GLMS are network-based services. The policy service is responsible for provide authorizations for group operations and stores the user's black/white lists, company policies and other global rules.

The method assumes that User A has created a group that includes User B and other members. User B was part of the group either by default or had previously given authorization to be part of the group (e.g., through the opt-in process). User B learns the Group URI when the Group URI is included as part of the notification via the GLMS directly if the user has subscribed to group events, or the Group URI is sent to the address book via the synchronization service (if the user has the synchronization service). Upon completion of this process flow User B opts-out of the group and the GLMS notifies the group owner and modifies the group attribute accordingly.

User B is part of a group created by User A that includes him/her as the member (Step 1001*a*). Depending on the group type, User B may have provided prior authorizations to be included in the group (opt-in process). User B then obtains the group URI either through a group event notification or an address book synchronization service.

User A performs a subscription to group changes (Step 1001*b*). User B decides not to be part of the group (Step 1002). From the device user interface, the user selects the group to either reject or suspend his/her membership from the group. The device client sends an XCAP PUT message to the GLMS via the aggregation proxy (not illustrated).

The GLMS processes the XCAP PUT and ensures that the device has the proper authorization to remove himself/herself from the group (Step 1003). For example, a corporation may not allow some members to opt-out or suspend themselves from groups. This authorization may not require an interaction with the policy service if the group semantics define that no opt-out is allowed, for example. Optionally, the GLMS may collaborate with the policy service to ensure User B is authorized to opt-out.

The GLMS sends an API call to the policy service that includes the group name, group type, group owner and the member who is requesting an opt-out (Step 1004). The policy service executes its opt-out process to verify if User B is allowed to opt-out (Step 1005). The policy service sends the authorization decision to the GLMS (Step 1006), and the GLMS acknowledges the receipt of the rejection/suspension request from User B with a HTTP 200 OK message (Step 1007). If group owner and other members of the group have subscribed to group changes, the GLMS notifies them of this change (Step 1008). User A's device client acknowledges the receipt of the group change notification with a 200 OK message (Step 1009).

Figure 11A:
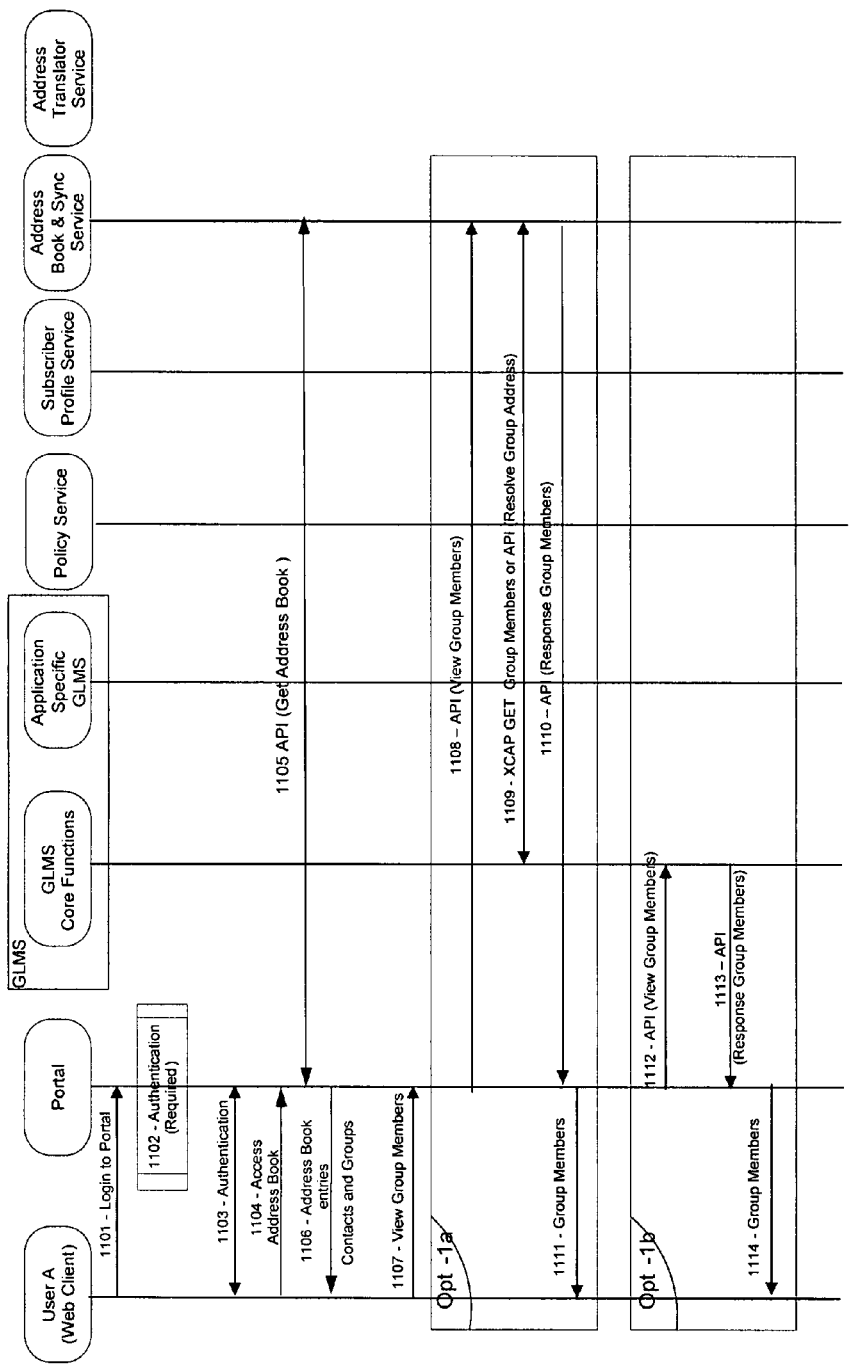
FIGS. 11a-11c illustrate call flow diagrams of an exemplary method for group management in accordance with the present invention.
Figure 11B:
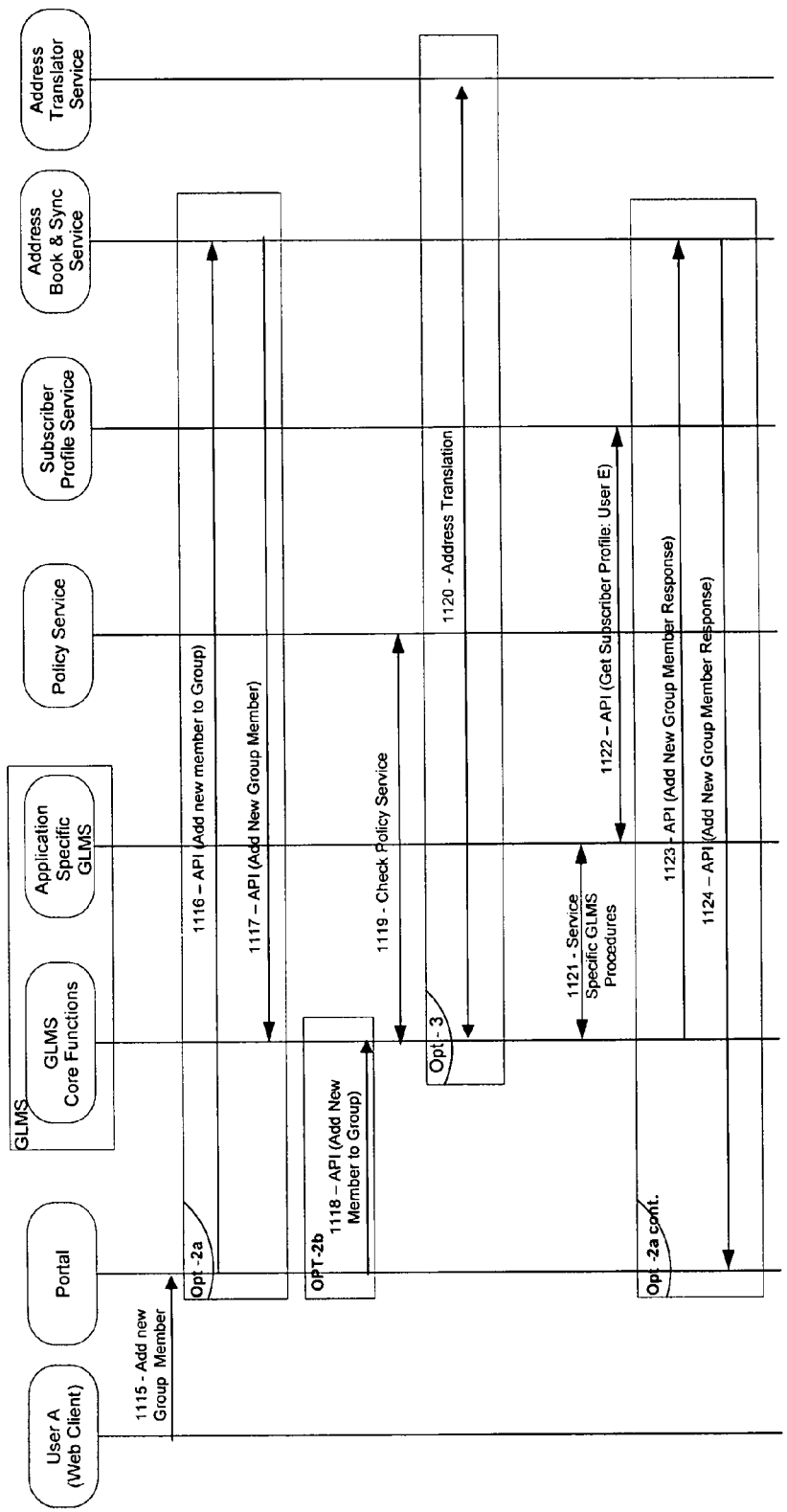
Figure 11C:
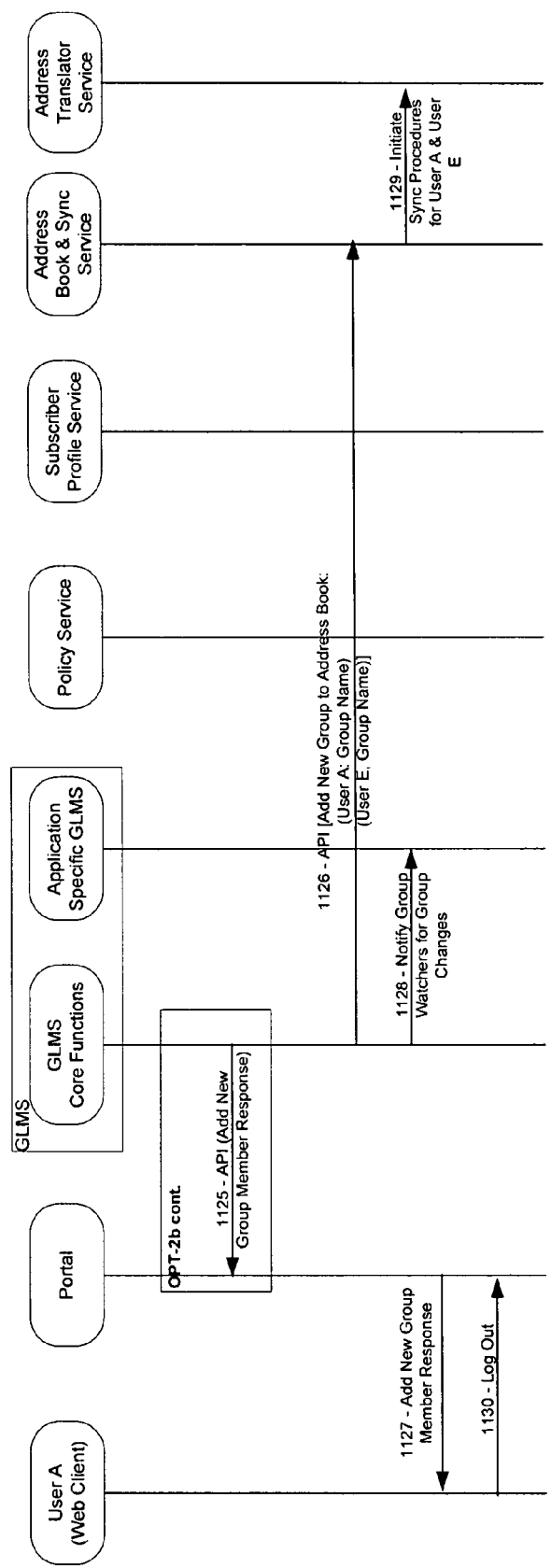

FIGS. 11*a*-11*c* are call flow diagrams of an exemplary method for group management via a portal in accordance with the present invention. Since the portal can be accessed by any web-based client, the orchestration between the various back-end services is a little bit different and is elaborated here. Web browsers (web clients) generally do not support XCAP, and accordingly, the portal performs some customized operations.

The portal provides a front-end web interface for subscribers to manage and view their accounts, personal data, personalized content, subscribed features and services, etc. User A logs-in via the portal to perform group management functions. The GLMS provides the group list management service. The address book and synchronization service are network-based services that act as a backup for the users' contacts and provides a synchronization service.

The policy service is responsible for provide authorizations for group operations. It stores the users Black/White list, company policies and other global rules. The subscriber profile service makes the subscriber profile available to other service enablers via published interface. The profile contains operator provisioned attributes of a subscriber that generally include the subscribed features, public and private profiles etc. The application-specific function takes care of any application-specific group processing logic and rules that the common GLMS does not provide. This could be a software plug-in module or an independent physical entity.

User E is a new user being added to the group, and the user has subscribed to the address book and synchronization service. The call flow of FIGS. 11*a*-11*c* assume that User A has previously created a group and is now logging on to the portal to perform group related functions. Upon completion of the call flow the requested actions from the web based client have been successfully executed.

Using a web client the user logs-in to the company portal, such as a network operator, MVNO or even an enterprise portal (Step 1101). The portal determines that authentication is required (Step 1102). Authorization to some level is also performed at the portal, but that authorization is not relevant for group management so is not discussed here.

The portal sends an unauthorized HTTP message to request credentials (Step 1103) and User A's device responds with the necessary information. The user clicks on a link to access the address book (Step 1104), and the portal retrieves the address book entries from the address book service (Step 1105). The address book entries that include individual contacts and groups are sent to the web client portal (Step 1106), and then the user selects a group address and clicks to see the member list (Step 1107).

In Option 1*a* the portal interacts with the address book service for all "contact" list management operations. In Option 1*b* the portal interacts with the GLMS directly to perform the group operations and for other "contact" management it interacts with the address book service.

In accordance with Option 1*a*, the portal uses an API function call to the address book service to obtain the group members (Step 1108). The address book service uses an API or a XCAP GET method to retrieve the group members from the GLMS (Step 1109), and then sends a response to the portal that includes the members of the group (Step 1110). The portal sends the group member list to the web client to be rendered on user's device (Step 1111).

In Option 1*b* the portal sends an API command to the GLMS to retrieve the group members (Step 1112). Alternatively, the portal could also implement the XDMC GET method. The GLMS responds to the request with the list of group members (Step 1113). The portal sends the group member list to the web client to render on user's device (Step 1114).

Assume now that User A wants to add a new member User E to the group (Step 1115). Similar to that described above, there are two implementations of the portal to support this. In this Option 2a the portal interacts with the address book service for all "contact" list management operations including groups. In Option 2b the portal interacts with the GLMS directly to perform the group operations and for other "contact" management it interacts with the address book service.

In accordance with Option 2a, the portal sends the request to the address book service using a publish API method (Step 1116). The address book has extended APIs to include group management. The address book service proxies the request to the GLMS (Step 1117). If the APIs are different, the address book service performs the necessary conversion.

In Option 2b the portal sends the add member request to the GLMS directly (Step 1118). In this case the portal is aware of the contacts' context and the portal differentiates between address book services like individual contacts management versus group management. The GLMS retrieves the necessary policies and profiles to ensure proper authorization of the incoming request (Step 1119). The policy service may initiate opt-in procedures the policy service may have to notify User E to get explicit authorization.

The GLMS may, optionally, need to invoke address translation services if there is a necessity to perform address translation for the new member (Step 1120). Step 1120 is optional and may not be needed for all applications.

If needed, the GLMS invokes application-specific functions to perform appropriate logic (Step 1121). The application-specific GLMS functions may need to get application-specific parameters from the subscriber profile service in order to process the request (Step 1122).

Returning now to Option 2a, once the application-specific tasks have been completed, the GLMS responds to the add member request of Step 1117 from the address book service indicating if the request was successful; otherwise it will respond with an appropriate error message (Step 1123). The address book service responds to the request of step 1116 from the portal by proxying the message from the GLMS (Step 1124). Message translations may be required if the formats are different.

Returning now to Option 2b, the GLMS directly responds to the request from the portal received in Step 1118 (Step 1125). Assuming that User E has subscribed to synchronization service (Step 1126). The GLMS is aware of this subscription for User E's profile it retrieved in Step 1122. The GLMS notifies the address and synchronization services to push the group identifier to the new User E. Furthermore, if the portal is used to create a "New" group and User A has also subscribed to the address book and synchronization service the GLMS will also include User A in the API call to the address book service. If it is just group modifications then in this Step 1126, User A is not included because the address book entries of the User A have not changed. This step is optional if none of the members have subscribed to the address book and synchronization service. Optionally, the users may have subscribed to the "group" event; in that case the GLMS would send a SIP Notify to the members.

The portal acknowledges user request for new member addition in Step 1115 (Step 1127). The GLMS notifies all watchers of this group of modification made by User A (Step 1128). The address book and synchronization service initiates the synchronization procedure for the new user (Step 1129). Synchronization is not required for other members as the member list are not expected to be synchronized.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for supporting group communications, the system comprising:
    a group management server, which creates and stores unique identifier information for a group to be used by at least two communication applications to address the group; and
    a subscriber profile service, coupled to the group management server, wherein the subscriber profile service stores information related to subscribers of the at least two communication applications, wherein the at least two communication applications include electronic mail, voice interconnect, voice dispatch, instant messaging, short message service (SMS) or multimedia message service (MMS),
    wherein if one of the communication applications cannot use the unique identifier information to address the group, the group management server creates an application-specific identifier which is an alias of the unique identifier information to enable the communication application to address the group.

2. The system of claim 1, further comprising:
    an address translation service coupled to the group management server, wherein the address translation service stores the application-specific identifier for each member of a group.

3. The system of claim 1, further comprising:
    a presence service coupled to the group management server.

4. The system of claim 1, further comprising:
    an address book service coupled to the group management server.

5. The system of claim 4, further comprising:
    a synchronization service coupled to the group management server, wherein when a new group is created by the group management server, unique identifier information of the new group is sent to the address book and synchronization services and the synchronization service synchronizes the unique identifier information to other group members.

6. The system of claim 1, further comprising:
    a data distribution function coupled between the group management server and an application server, wherein the group management server provides updated group information to the data distribution function.

7. The system of claim 6, wherein the data distribution function includes an interface with the group management server that operates according to open database connectivity protocol (ODBC), session initiation protocol (SIP) or web services protocol.

8. The system of claim 1, further comprising:
    an aggregation proxy coupled between the group management server and one or more user devices, wherein the aggregation proxy authenticates the user devices accessing the group management server.

9. The system of claim 1, further comprising:
    a charging function coupled to the group management server, the charging function generates charges for usage of services of the group management server.

10. The system of claim 9, wherein the group management server includes a charging trigger function that interfaces with the charging function for real-time charging of prepaid subscribers.

11. The system of claim 1, wherein the group management server stores group information in an eXtensible Markup Language (XML) format.

12. The system of claim 1, wherein a user terminal communicates with the group management server using session initiation protocol (SIP).

13. The system of claim 1, wherein a user terminal manages groups stored in the group management server using eXtensible Markup Language document management server (XDMS) protocol.

14. The system of claim 1, wherein a user terminal manages groups stored in the group management server using Open Mobile Alliance (OMA) Device Management (DM) protocol.

15. The system of claim 1, further comprising:
a policy service; and
a web portal, coupled to the policy service, wherein the web portal interacts with the policy service to create, view and manage groups.

16. The system of claim 1, wherein the group management server includes an interface for authorization services and integration of web services.

17. The system of claim 1, wherein the group management server and subscriber profile service are coupled via an interface that operates according to a DIAMETER-based protocol or web services-based protocol.

18. The system of claim 1, wherein the subscriber profile service identifies whether a subscriber is authorized to use group management services.

19. The system of claim 1, wherein the group management server supports opting into groups, opting out of groups, delegating group creation or updating, creating, reading, updating and deleting groups, group suspension, globally unique identifiers, application-specific identifiers, or different addressing formats.

20. A system for supporting group communications, the system comprising:
a group management server, which generates and stores a globally unique group identifier for use by at least two communication applications to address a group; and
a synchronization service coupled to the group management server, wherein the synchronization service receives a group definition for the group from the group management server and distributes the definitions to members of the group,
wherein when one of the at least two communication applications do not support a format of the globally unique group identifier, the group management server also generates an application-specific group identifier associated with the globally unique group identifier for the communication application to address the group.

* * * * *